(12) United States Patent
Aarre et al.

(10) Patent No.: US 10,324,211 B2
(45) Date of Patent: Jun. 18, 2019

(54) SEISMIC SPECTRAL BALANCING

(71) Applicant: Schlumberger Technology Corporation, Sugar Land, TX (US)

(72) Inventors: Victor Aarre, Stavanger (NO); Sergio Courtade, Heggedal (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 9 days.

(21) Appl. No.: 15/632,376

(22) Filed: Jun. 25, 2017

(65) Prior Publication Data

US 2018/0024263 A1 Jan. 25, 2018

(51) Int. Cl.
*G01V 1/36* (2006.01)

(52) U.S. Cl.
CPC .............. *G01V 1/364* (2013.01); *G01V 1/362* (2013.01); *G01V 2210/21* (2013.01); *G01V 2210/23* (2013.01); *G01V 2210/52* (2013.01); *G01V 2210/584* (2013.01)

(58) Field of Classification Search
CPC .... G01V 1/364; G01V 1/362; G01V 2210/21; G01V 2210/52; G01V 2210/584; G01V 2210/23
USPC .......................................................... 367/43
See application file for complete search history.

(56) References Cited

U.S. PATENT DOCUMENTS

| 5,870,691 A | 2/1999 | Partyka et al. |
| 2002/0141287 A1 | 10/2002 | Larzratos |
| 2002/0183931 A1* | 12/2002 | Anno ............... G01V 1/364 702/14 |
| 2005/0075790 A1 | 4/2005 | Taner |
| 2012/0075950 A1 | 3/2012 | Kragh et al. |
| 2012/0106294 A1* | 5/2012 | Blias ................ G01V 1/42 367/38 |

FOREIGN PATENT DOCUMENTS

WO 2009/136387 A2 11/2009

OTHER PUBLICATIONS

Wikipedia, "Blind deconvolution", retrieved on Jun. 23, 2017 at https://en.wikipedia.org/wiki/Blind_deconvolution.
International Search Report and Written Opinion for the equivalent International patent application PCT/US2016/043794 dated Apr. 21, 2017.
International Preliminary Report on Patentability for PCT/US2016/043794 dated Feb. 7, 2019.

* cited by examiner

*Primary Examiner* — Daniel L Murphy
(74) *Attorney, Agent, or Firm* — Gary Gex

(57) ABSTRACT

A method can include receiving seismic data that has an associated bandwidth; for a number of frequency bands, for a number of frequency bands, iteratively filtering and adjusting the seismic data by applying band-pass filters to extract information associated with each of the frequency bands where the adjusting the seismic data includes, after each iteration, subtracting extracted information from the seismic data prior to a subsequent iteration; balancing the extracted information to generate spectrally balanced seismic data; and outputting the spectrally balanced seismic data.

20 Claims, 19 Drawing Sheets

Trends 610

| Θ | Path Length | Frequency | Layer Thickness |
|---|---|---|---|
| 10° | 2*z*1.01 | | |
| 20° | 2*z*1.06 | | |
| 30° | 2*z*1.15 | | |
| 40° | 2*z*1.31 | | |
| 50° | 2*z*1.56 | | |
| 60° | 2*z*2.00 | | |

Fig. 6

SEISMIC SPECTRAL BALANCING

CROSS REFERENCE TO RELATED APPLICATIONS

This application claims the benefit of priority to International Patent Application PCT/US2016/043794, filed on Jul. 25, 2016, the entire content of which is incorporated herein by reference.

BACKGROUND

Seismic interpretation is a process that may examine seismic data (e.g., location and time or depth) in an effort to identify subsurface structures such as horizons and faults. Structures may be, for example, faulted stratigraphic formations indicative of hydrocarbon traps or flow channels. In the field of resource extraction, enhancements to seismic interpretation can allow for construction of a more accurate model, which, in turn, may improve seismic volume analysis for purposes of resource extraction. Various techniques described herein pertain to processing of seismic data, for example, for analysis of such data to characterize one or more regions in a geologic environment and, for example, to perform one or more operations (e.g., field operations, etc.).

SUMMARY

A method can include receiving seismic data that has an associated bandwidth; for a number of frequency bands, for a number of frequency bands, iteratively filtering and adjusting the seismic data by applying band-pass filters to extract information associated with each of the frequency bands where the adjusting the seismic data includes, after each iteration, subtracting extracted information from the seismic data prior to a subsequent iteration; balancing the extracted information to generate spectrally balanced seismic data; and outputting the spectrally balanced seismic data. A system can include a processor; memory operatively coupled to the processor; and processor-executable instructions stored in the memory to instruct the system where the instructions include instructions to receive seismic data that has an associated bandwidth; for a number of frequency bands, iteratively filter and adjust the seismic data by application of band-pass filters to extract information associated with each of the frequency bands where to adjust the seismic data includes, after each iteration, to subtract extracted information from the seismic data prior to a subsequent iteration; balance the extracted information to generate spectrally balanced seismic data; and output the spectrally balanced seismic data. One or more computer-readable storage media can include computer-executable instructions to instruct a computer where the instructions include instructions to receive seismic data that has an associated bandwidth; for a number of frequency bands, iteratively filter and adjust the seismic data by application of band-pass filters to extract information associated with each of the frequency bands where to adjust the seismic data includes, after each iteration, to subtract extracted information from the seismic data prior to a subsequent iteration; balance the extracted information to generate spectrally balanced seismic data; and output the spectrally balanced seismic data. Various other methods, systems, etc., are also described herein.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 6 illustrates examples of trends with respect to survey angles;

DETAILED DESCRIPTION

This description is not to be taken in a limiting sense, but rather is made merely for the purpose of describing the general principles of the implementations. The scope of the described implementations should be ascertained with reference to the issued claims.

Figure 1:
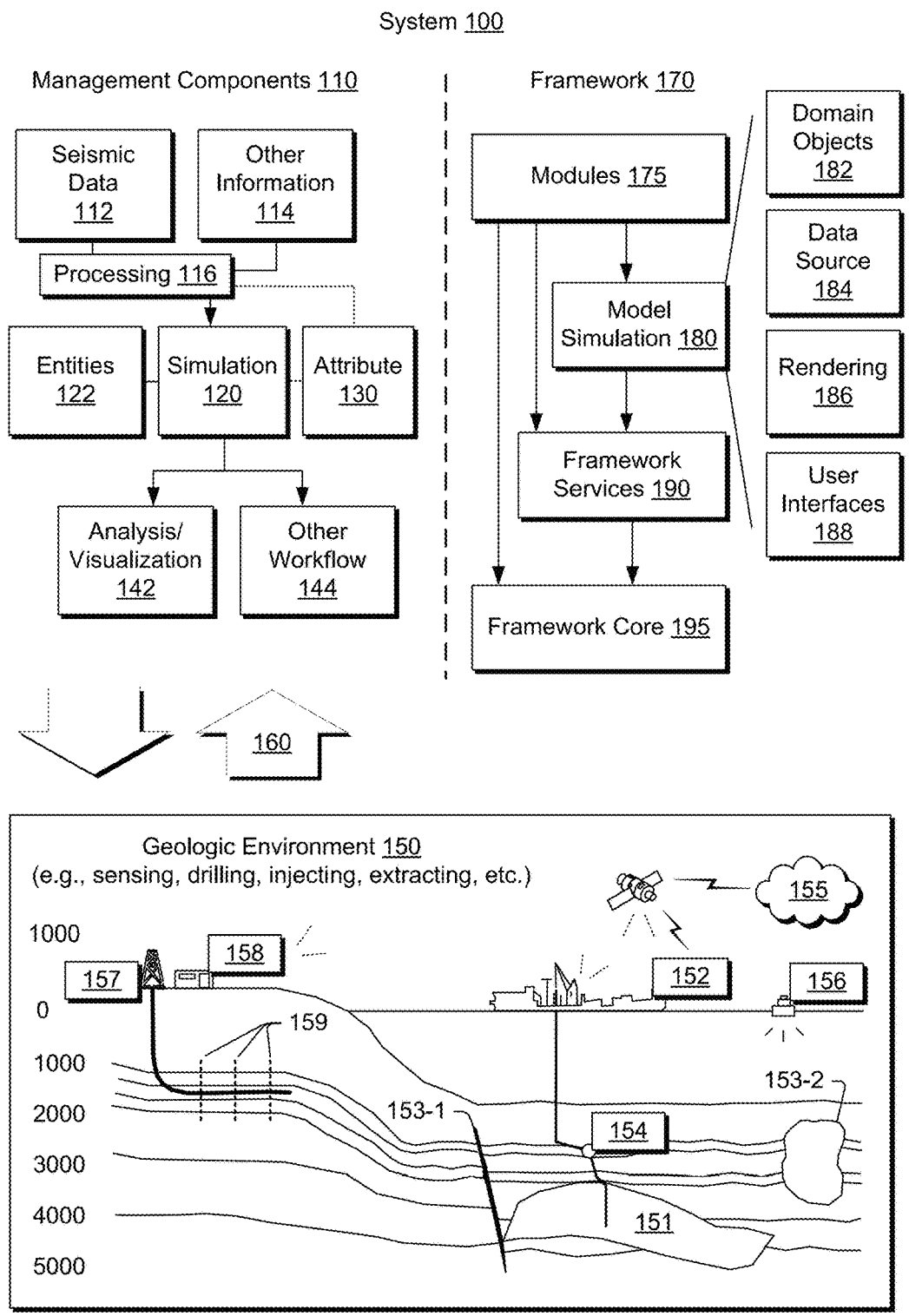
FIG. 1 illustrates an example system that includes various components for modeling a geologic environment and various equipment associated with the geologic environment.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator (Schlumberger Limited, Houston Tex.), the INTERSECT® reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
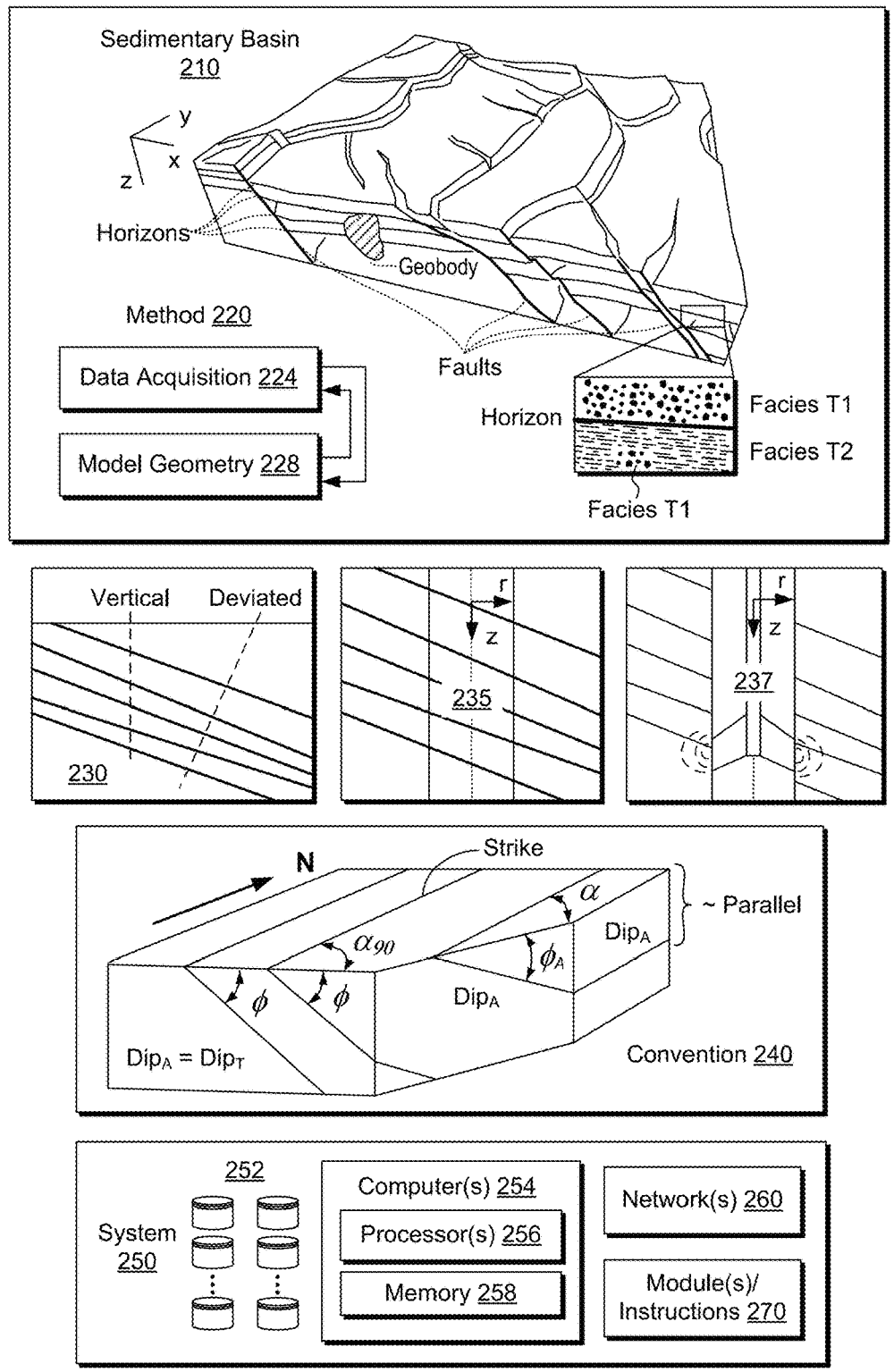
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in another direction except in the direction of true dip (see, e.g., $\phi_A$ as $Dip_A$ for angle α); however, it is possible that the apparent dip is equal to the true dip (see, e.g., φ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with φ as $Dip_A=Dip_T$ for angle $\alpha_{90}$ with respect to the strike). As indicated, dip observed in a cross-section in another direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In a well drilled in another orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., DipR). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less that 1 Hz and/or optionally more than 100 Hz). Seismic data may be processed and interpreted, for example, to understand better composition, fluid content, extent and geometry of subsurface rocks.

Figure 3:
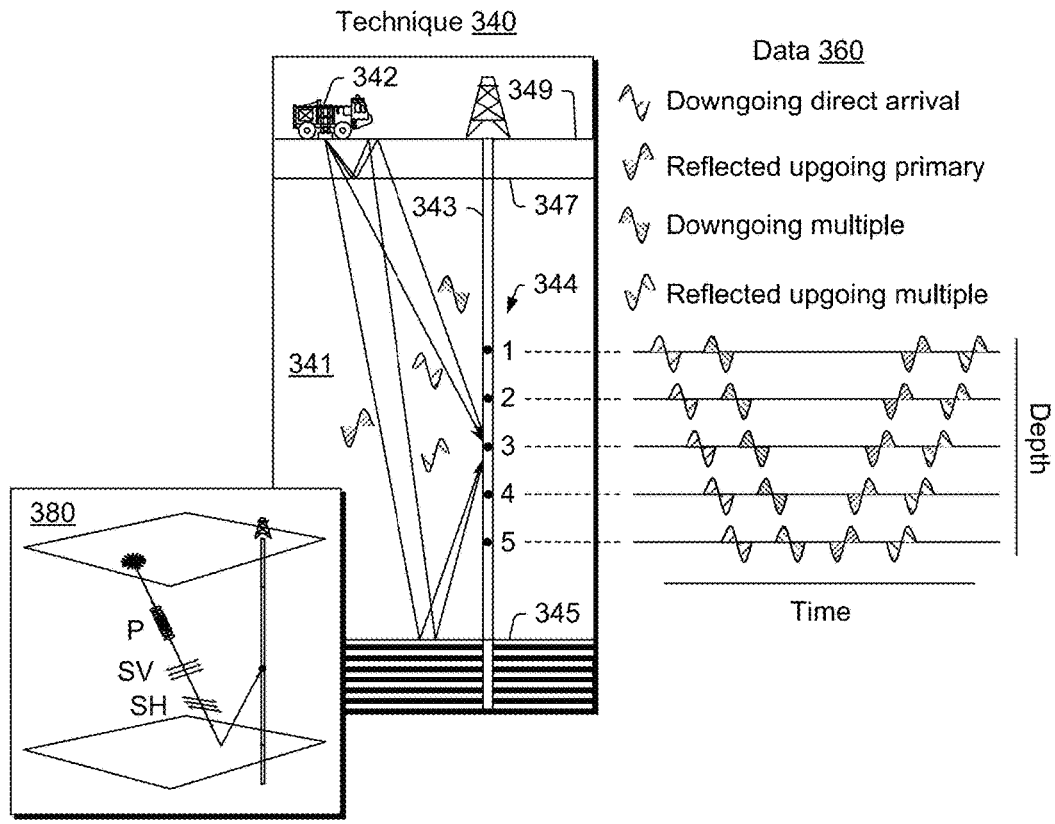
FIG. 3 illustrates an example of a technique that may acquire data.
Figure 3:
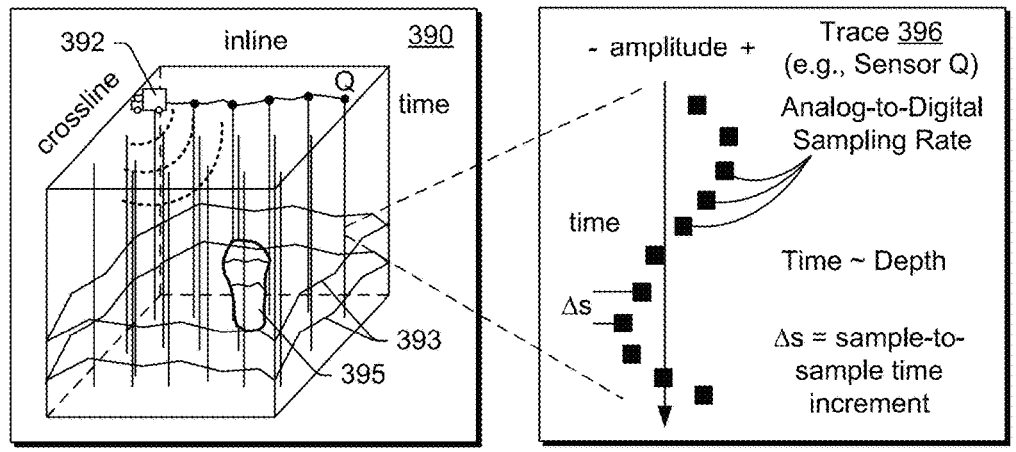

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\varepsilon$, $\delta$ and $\gamma$. The Thomsen parameter $\delta$ describes depth mismatch between logs (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\varepsilon$ and $\gamma$ may be estimated from wave data while estimation of the Thomsen parameter $\delta$ may involve access to additional information. As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 4:
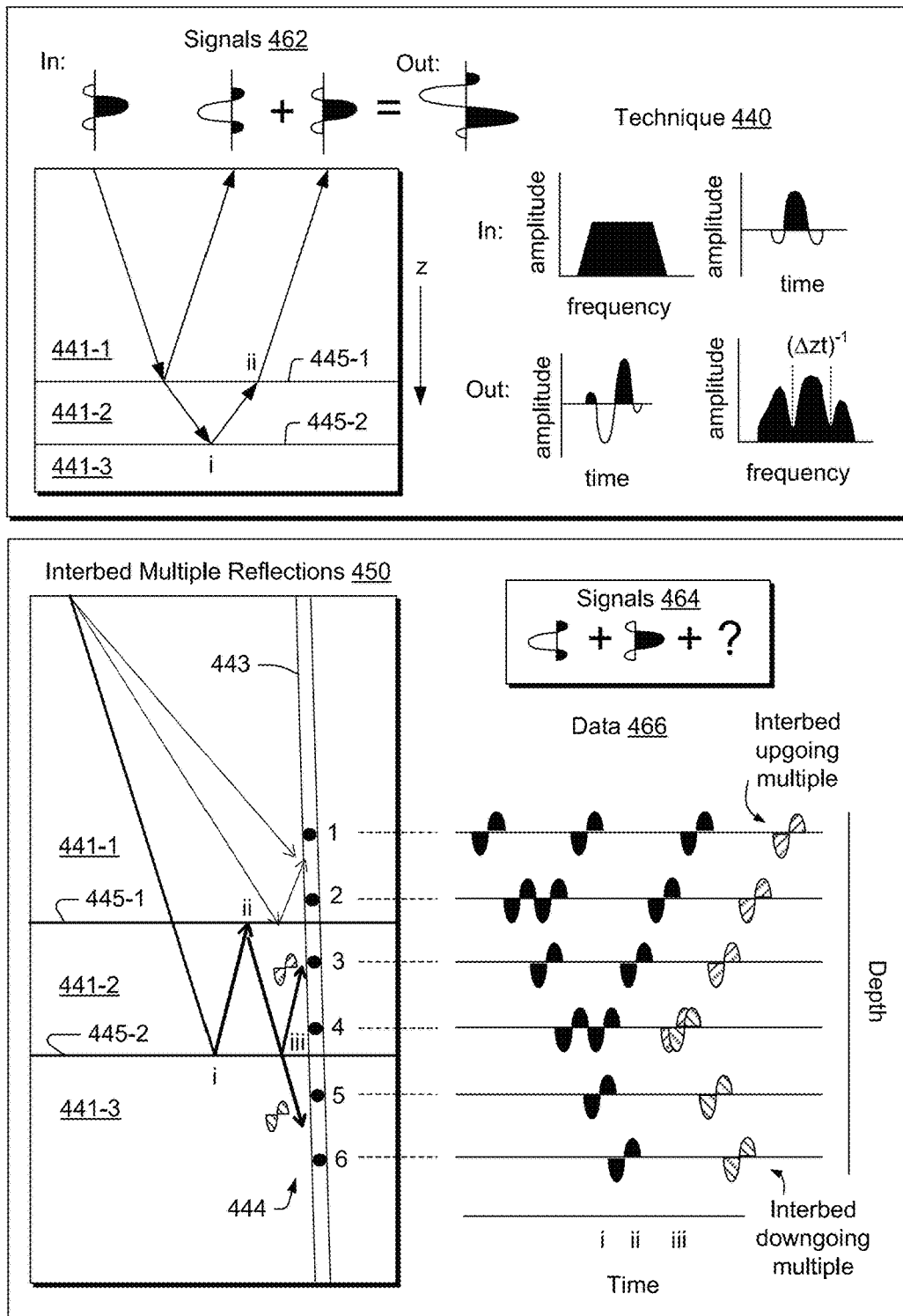
FIG. 4 illustrates examples of signals, an example of a technique, examples of data, etc.

FIG. 4 shows an example of a technique 440, examples of signals 462 associated with the technique 440, examples of interbed multiple reflections 450 and examples of signals 464 and data 466 associated with the interbed multiple reflections 450. As an example, the technique 440 may include emitting energy with respect to time where the energy may be represented in a frequency domain, for example, as a band of frequencies (e.g., or bands of frequencies). In such an example, the emitted energy may be a wavelet and, for example, referred to as a source wavelet which has a corresponding frequency spectrum (e.g., per a Fourier transform of the wavelet).

As an example, a geologic environment may include layers 441-1, 441-2 and 441-3 where an interface 445-1 exists between the layers 441-1 and 441-2 and where an interface 445-2 exists between the layers 441-2 and 441-3. As illustrated in FIG. 4, a wavelet may be first transmitted downward in the layer 441-1; be, in part, reflected upward by the interface 445-1 and transmitted upward in the layer 441-1; be, in part, transmitted through the interface 445-1 and transmitted downward in the layer 441-2; be, in part, reflected upward by the interface 445-2 (see, e.g., "i") and transmitted upward in the layer 441-2; and be, in part, transmitted through the interface 445-1 (see, e.g., "ii") and again transmitted in the layer 441-1. In such an example, signals (see, e.g., the signals 462) may be received as a result of wavelet reflection from the interface 445-1 and as a result of wavelet reflection from the interface 445-2. These signals may be shifted in time and in polarity such that addition of these signals results in a waveform that may be analyzed to derive some information as to one or more characteristics of the layer 441-2 (e.g., and/or one or more of the interfaces 445-1 and 445-2). For example, a Fourier transform of signals may provide information in a frequency domain that can be used to estimate a temporal thickness (e.g., $\Delta zt$) of the layer 441-2 (e.g., as related to acoustic impedance, reflectivity, etc.).

As to the data 466, as an example, they illustrate further transmissions of emitted energy, including transmissions associated with the interbed multiple reflections 450. For example, while the technique 440 is illustrated with respect to interface related events i and ii, the data 466 further account for additional interface related events, denoted iii, that stem from the event ii. Specifically, as shown in FIG. 4, energy is reflected downward by the interface 445-1 where a portion of that energy is transmitted through the interface 445-2 as an interbed downgoing multiple and where another portion of that energy is reflected upward by the interface 445-2 as an interbed upgoing multiple. These portions of energy may be received by one or more receivers 444 (e.g., disposed in a well 443) as signals. These signals may be summed with other signals, for example, as explained with respect to the technique 440. For example, such interbed multiple signals may be received by one or more receivers over a period of time in a manner that acts to "sum" their amplitudes with amplitudes of other signals (see, e.g., illustration of signals 462 where interbed multiple signals are represented by a question mark "?"). In such an example, the additional interbed signals may interfere with an analysis that aims to determine one or more characteristics of the layer 441-2 (e.g., and/or one or more of the interfaces 445-1 and 445-2). For example, interbed multiple signals may interfere with identification of a layer, an interface, interfaces, etc. (e.g., consider an analysis that determines temporal thickness of a layer, etc.).

Figure 5:
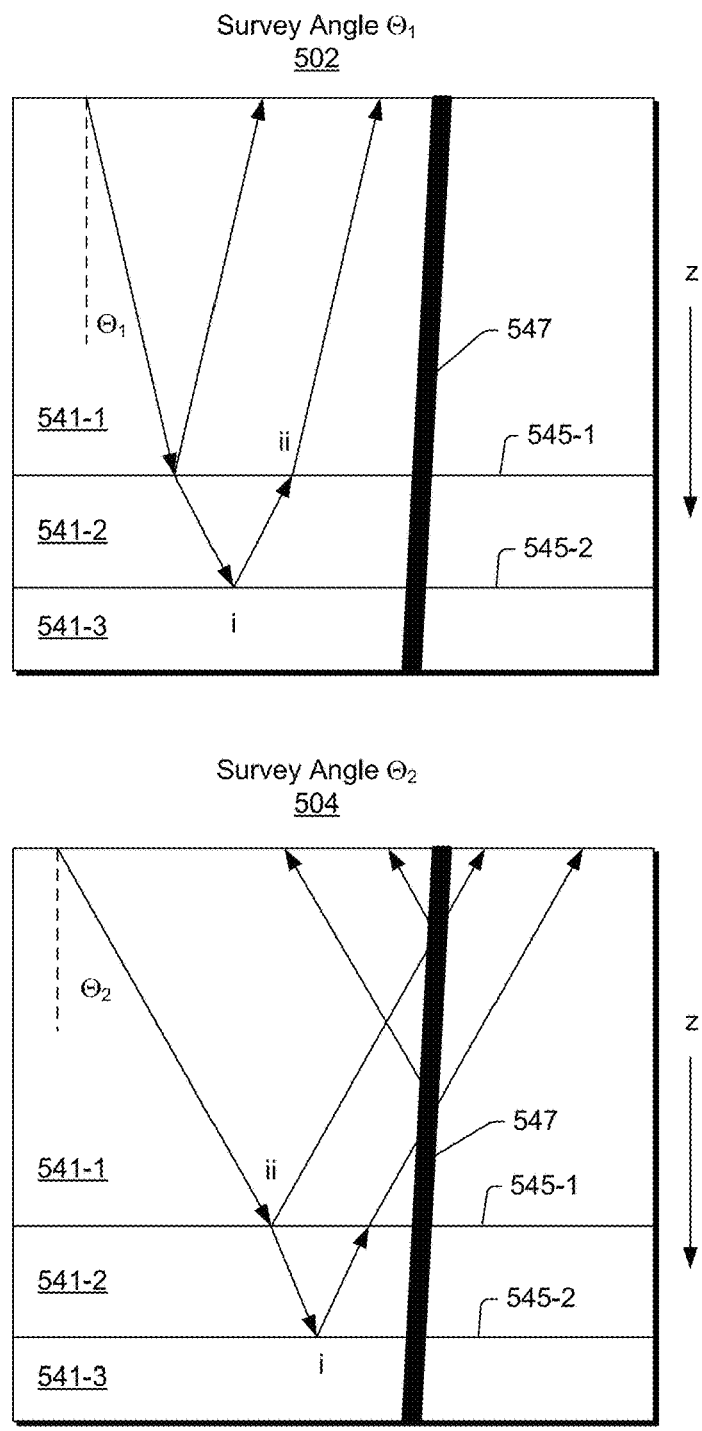
FIG. 5 illustrates examples of survey angles.

FIG. 5 shows examples 502 and 504 of survey angles $\Theta_1$ and $\Theta_2$ in a geologic environment that includes layers 541-1, 541-2 and 541-3 where an interface 545-1 exists between the layers 541-1 and 541-2, where an interface 545-2 exists between the layers 541-2 and 541-3 and where a relatively vertical feature 547 extends through the layers 541-1, 541-2 and 541-3.

As shown in the examples 502 and 504, the angle $\Theta_1$ is less than the angle $\Theta_2$. As angle increases, path length of a wave traveling in a subsurface region from an emitter to a detector increases, which can lead to attenuation of higher frequencies and increased interactions with features such as the feature 547. Thus, arrangements of emitters and detectors can, for a particular subsurface region, have an effect on acquired seismic survey data that covers that subsurface region.

FIG. 6 shows examples of trends 610 that may exist as angle increases. The trends 610 include a path length trend where path length increases with respect to angle, a frequency trend where higher frequencies are attenuated with respect to angle and where "resolution" with respect to layer thickness decreases with respect to angle (e.g., smaller angles may provide high resolution that can distinguish thinner layers).

Figure 7:
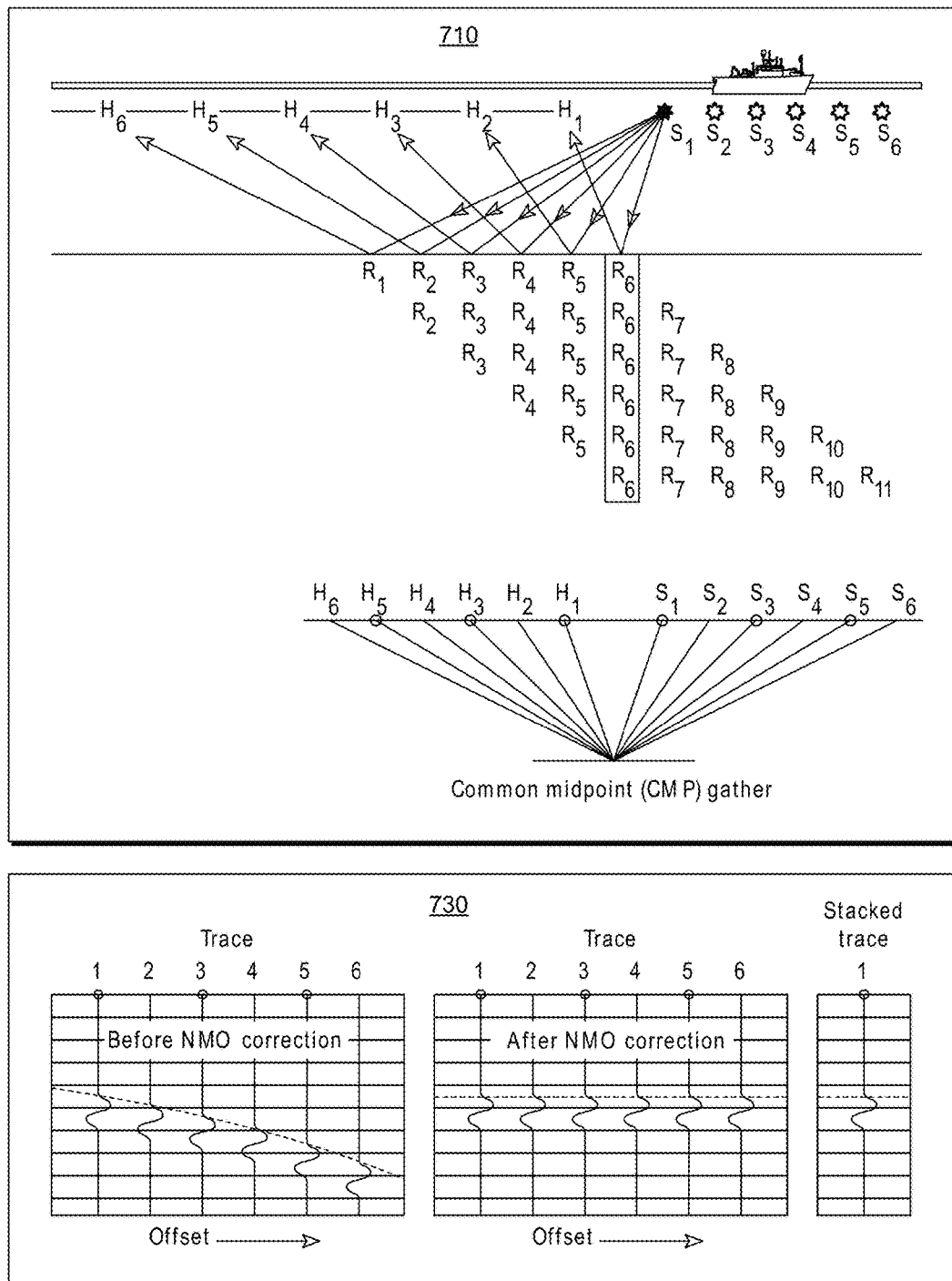
FIG. 7 illustrates an example of a survey and an example of a moveout technique.

FIG. 7 shows an example of a survey technique 710 and an example of processing seismic data 730, which may be referred to as normal moveout (NMO). NMO aims to account for the effect of the separation between receiver and source on the arrival time of a reflection that does not dip. A reflection may arrive first at the receiver nearest the source. The offset between the source and other receivers induces a delay in the arrival time of a reflection from a horizontal surface at depth. A plot of arrival times versus offset has a hyperbolic shape.

As shown in the example of FIG. 7, traces from different source-receiver pairs that share a common midpoint (CMP), such as receiver 6 (R6), can be adjusted during seismic processing to remove effects of different source-receiver offsets, or NMO. After NMO adjustments, the traces can be stacked to improve the signal-to-noise ratio.

Figure 8:
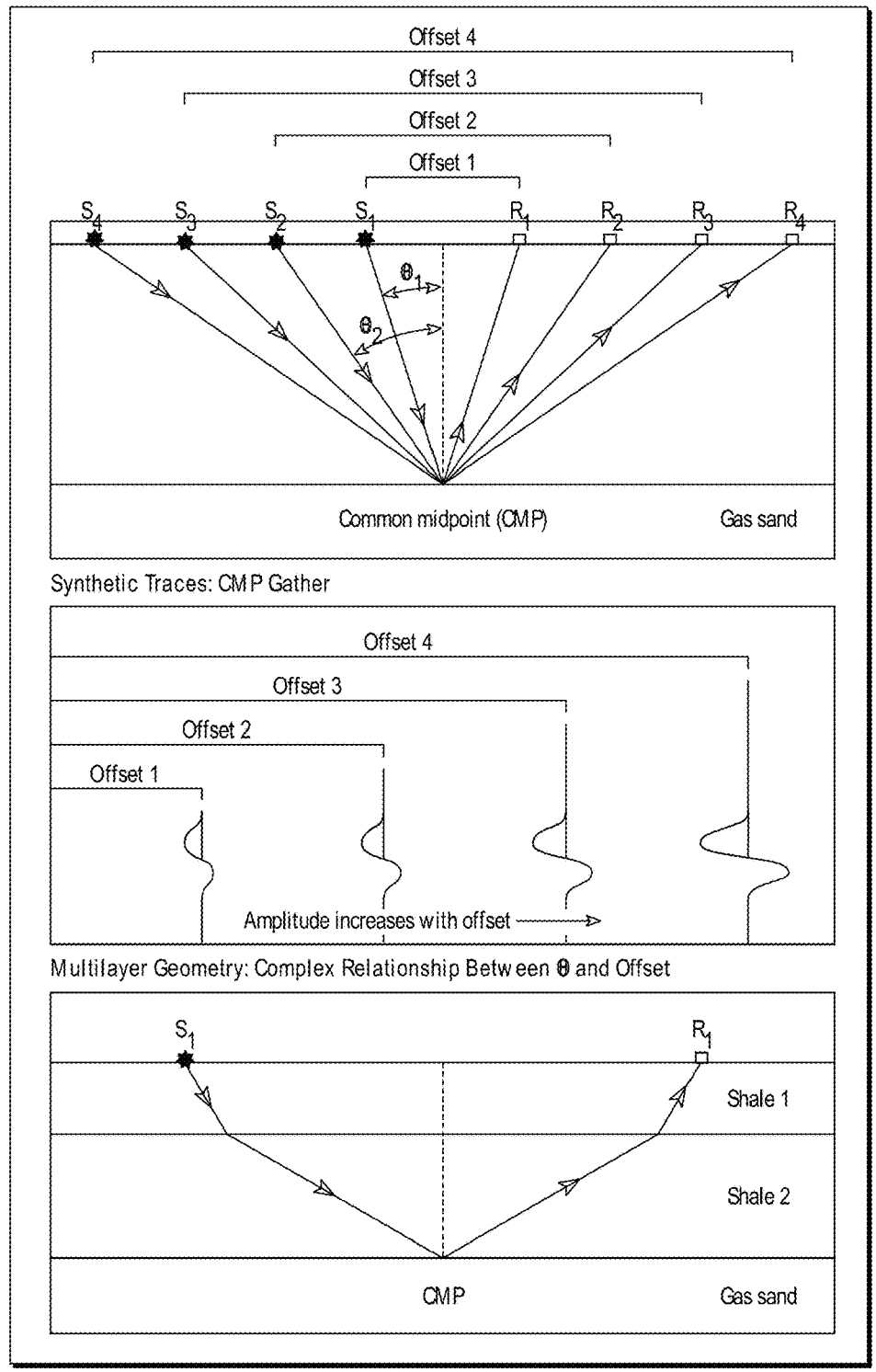
FIG. 8 illustrates an example of a survey and associated processing.

FIG. 8 shows an example of various AVO processes where angles exist between a common midpoint (CMP) and sources and receivers. As shown in FIG. 8, amplitude can increase with offset. In such an example, averaging the four traces with Offsets 1, 2, 3 and 4 would produce a trace that does not resemble a zero-offset trace; in other words, stacking would not preserve amplitudes. As shown in the lower view of FIG. 8, the offset versus angle relationship may be determined by, for example, ray tracing.

Figure 9:
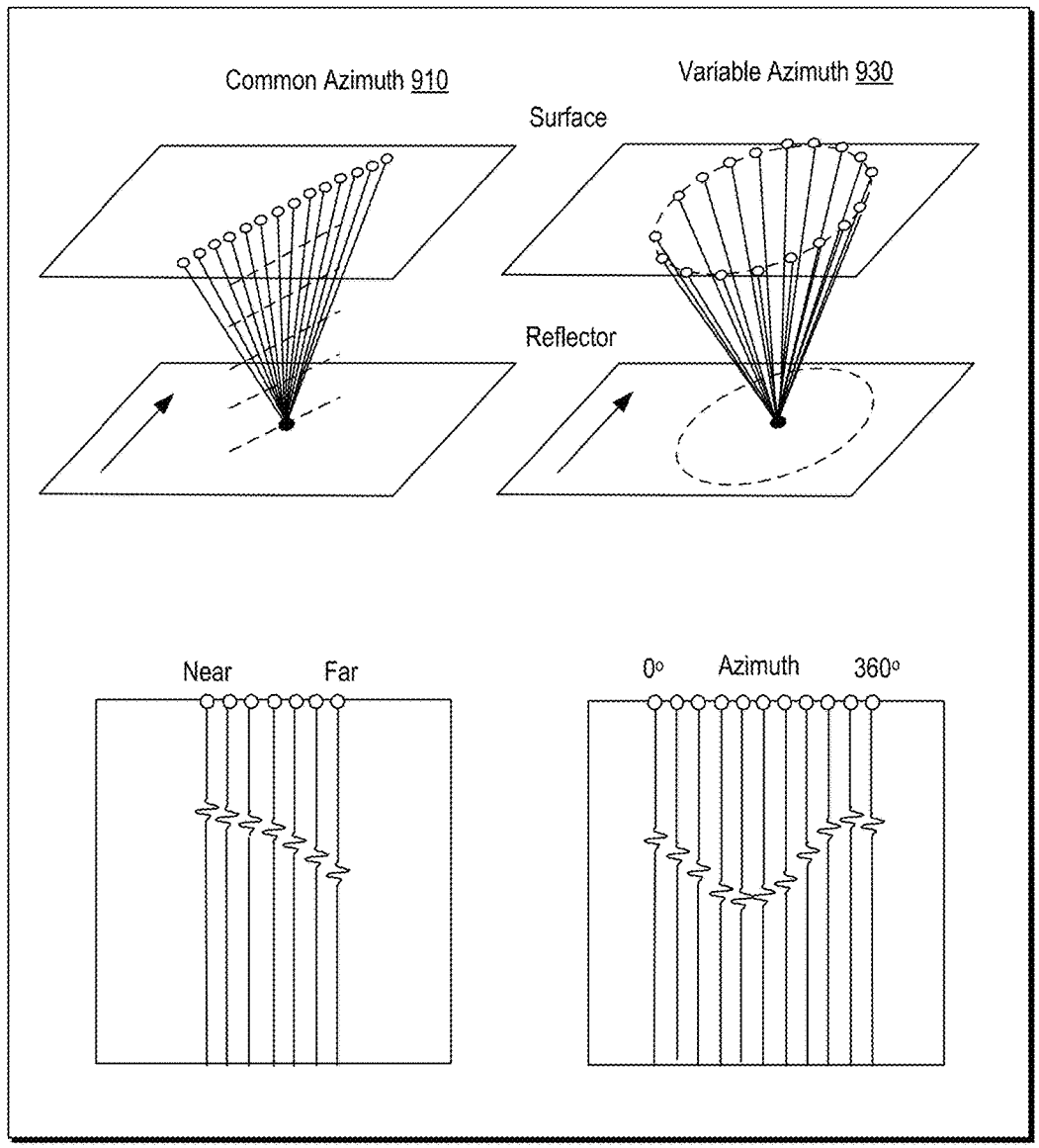
FIG. 9 illustrates an example of a common azimuth survey and an example of a variable azimuth survey.

FIG. 9 shows an example of a survey with common azimuth 910 and an example of a survey with variable azimuth 930. As shown in FIG. 9, variations for the common azimuth with respect to near and far source-receiver distance correspond to the trend illustrated in FIG. 7 (e.g., where NMO may be applied) while variations for the variable azimuth correspond to a different type of trend.

As mentioned with respect to FIG. 4, the technique 440 may include emitting energy with respect to time where the energy may be represented in a frequency domain, for example, as a band of frequencies (e.g., or bands of frequencies) and where the energy may be a wavelet and, for example, referred to as a source wavelet which has a corresponding frequency spectrum (e.g., per a Fourier transform of the wavelet). Signals received by one or more sensors can include information as to the wavelet, interactions with subterranean features (e.g., structures) in a geologic environment and noise. Such signals may be shifted in time and in polarity such that addition of these signals results in a waveform that may be analyzed to derive some information as to one or more characteristics of the subterranean features. For example, a Fourier transform of signals may provide information in a frequency domain that can be used to estimate a temporal thickness (e.g., $\Delta zt$) of a layer (e.g., as related to acoustic impedance, reflectivity, etc.).

As an example, a workflow may aim to extract as much vertical resolution from data as possible where vertical resolution can correspond to temporal thickness. For example, the shorter the temporal thickness (e.g., as in milliseconds), the greater the vertical resolution. Increased vertical resolution can be desirable for workflows that aim to accurately land horizontal wells within target lithologies that fall at or below the limits of seismic resolution. While resolution can be increased with increasing the higher frequencies (e.g., higher frequency energy content), resolution may be measured in terms of a number of octaves, whereby halving the lowest frequency measured doubles the resolution. An octave can be defined as a doubling of a frequency or as a halving of a frequency. The term "octave" is derived from the Western musical scale where an octave is a doubling in frequency (e.g., from $C_4$ at about 261.6 Hz to $C_5$ at about 523.2 Hz).

Various reasons exist as to why seismic data tend to be band-limited. For example, where a vibrator sweep ranges between about 8 Hz and about 120 Hz, the signal outside of this frequency range can be in difficult to process (and possibly undesirable) harmonics (e.g., of a harmonic series, etc.). While dynamite sources and airgun sources may have higher frequencies, conversion of elastic to heat energy (e.g., intrinsic attenuation), scattering from rugose surfaces and thin bed reverberations (e.g., geometric attenuation) tend to attenuate higher frequencies (e.g., higher frequency energy) to a level or levels where they may fall below a noise threshold. Geophone and source arrays tend to attenuate short wavelength events where individual array elements can experience different statics.

Processing can also attenuate various frequencies. For example, a processor may filter out the lowest frequencies to attenuate ground roll and/or ocean swell noise. In such an example, small errors in statics and velocities may result in misaligned traces (e.g., seismic traces) that when stacked preserve lower frequencies but attenuate higher frequencies.

Some examples of approaches to spectral enhancement include those referred to as "bandwidth extension," "spectral broadening" and "spectral enhancement," which are based on a model akin to deconvolution, which assumes the Earth is composed of discrete, piecewise constant impedance layers. Such a "sparse spike" assumption allows for replacement of a seismic wavelet with a spike, which is then replaced with a broader band wavelet that can exceed the bandwidth of the seismic source. Various other approaches to spectral balancing are constrained to fall within the source bandwidth of the data.

Figure 10:
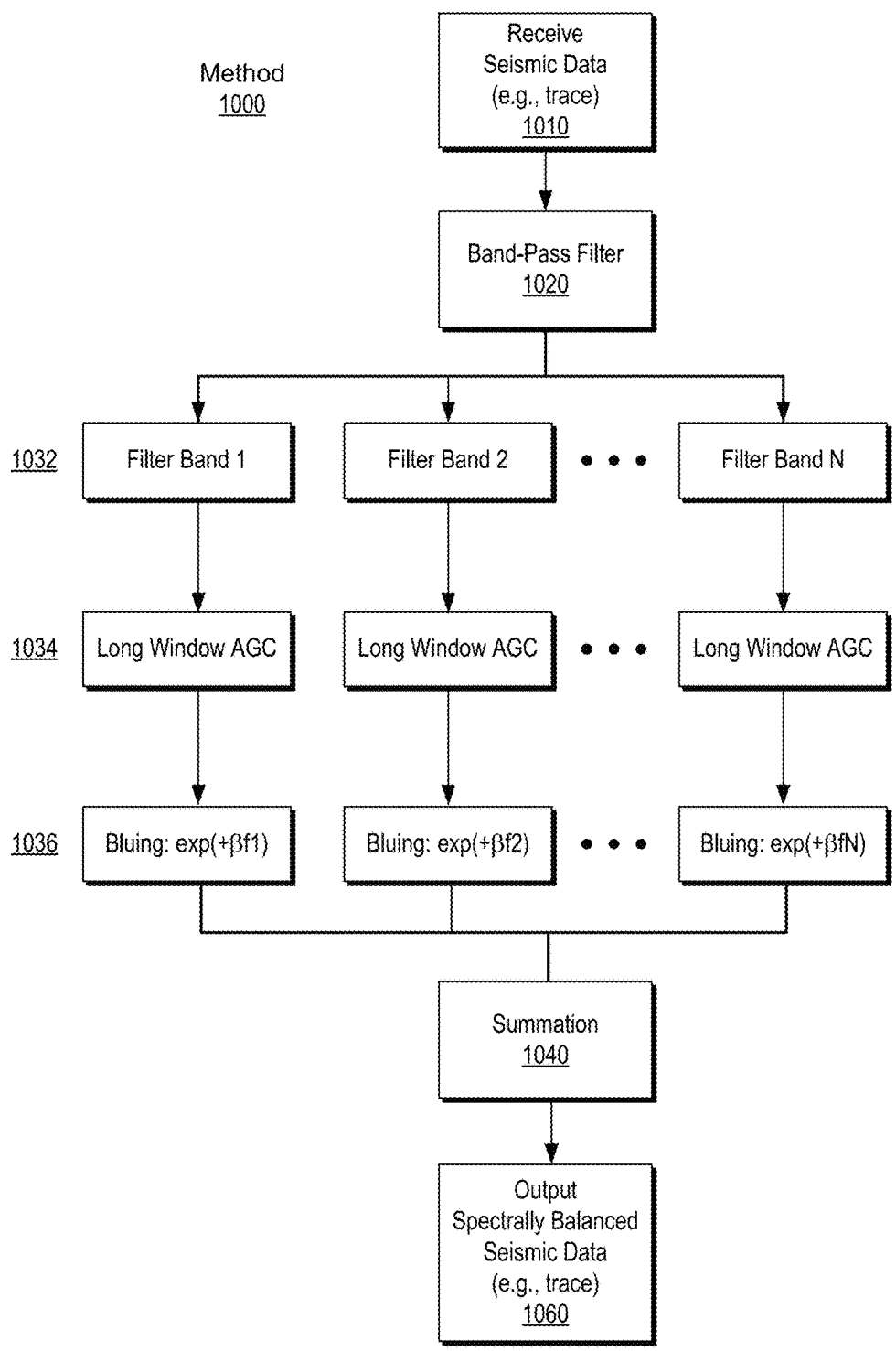
FIG. 10 illustrates an example of a method.

FIG. 10 shows an example of a method 1000 for spectral balancing in a manner constrained to fall within the source bandwidth of seismic data. As shown, the method 1000 includes a reception block 1010 for receiving seismic data, which may be in the form of a trace and a band-pass filter block 1020 for band-pass filtering the seismic data, for example, via a series of individual filters 1032 where each of the individual filters corresponds to a particular band, where windows 1034 are utilized that apply automatic gain control (AGC), and where bluing adjustments 1036 are applied, where blue refers to higher frequencies and red refers to lower frequencies; noting that a spectrum with a balance of frequency may be considered to be white. After band-pass filtering, the method 1000 includes a summation block 1040 that can sum the results of the band-pass filtering. As shown, an output block 1060 can provide for outputting spectrally balanced seismic data, which may be in the form of a seismic trace (e.g., a spectrally balanced seismic trace). As an example, the method 1000 may be applied to a plurality of traces, for example, consider applying the method 1000 to a seismic volume that includes a plurality of traces to output a spectrally balanced seismic volume that includes a plurality of spectrally balanced seismic traces.

In the method 1000 of FIG. 10, if the band-pass filter block 1020, per the blocks 1032, is performed in a Fourier/frequency domain, then it may be referred to as a classic approach; whereas, if the band-pass filter block 1020, per the blocks 1032, is performed in a time domain, for example, through the convolution of a series of relatively short-window filter wavelets, where window length is a function of the frequency, then it may be referred to as a continuous wavelet transformation (CWT) approach.

As an example, a seismic volume may be considered to be a tuning cube that includes information as to thin bed interference, a seismic wavelet and random noise. For example, consider such a tuning cube to be the product of thin bed interference multiplied by the seismic wavelet to which the random noise is added. As mentioned, seismic data can be acquired in a time domain and may optionally be transformed to a frequency domain, for example, via a Fourier transform. In such an example, in the frequency domain, a seismic trace may be represented in terms of amplitude versus frequency, which may have a shape that exhibits a characteristic or characteristics of the seismic wavelet in the frequency domain (e.g., a wavelet overprint). Where noise is random, in the frequency domain, it may be relatively flat in terms of amplitude with respect to frequency. As to thin bed reflectivity, in the frequency domain, it may exhibit a plurality of peaks that may be characterized at least in part via peak frequencies and notch frequencies (e.g., as to valleys).

Spectral balancing can split spectral tuning cube data into discrete frequencies and, for example, independently normalize each frequency data map to generate a plurality of spectrally balanced frequency data slices through the spectral tuning cube. These may then be summed to generate a spectrally balanced tuning cube. In such an example, the spectrally balanced tuning cube can more distinctly represent thin bed interference and noise, as evidence of the seismic wavelet may be diminished (e.g., reduction of the wavelet overprint). As mentioned, amplitude spectra can delineate thin bed variability via evidence as to spectral notching; noting that phase spectra may delineate lateral discontinuities via evidence of phase instabilities.

Referring again to the method 1000 of FIG. 10, such a method may be implemented as part of a workflow. For example, an interpreter may decompose each seismic trace into a suite of about 5 to about 10 overlapping pass band filtered (e.g., band-pass filtered) copies of the data. In such an example, each band-passed filtered version of the trace is then scaled such that the energy within a relatively long window (e.g. 1,000 ms) is similar down the trace (e.g., via application of automatic gain control according to a time window). In such an example, the components can be scaled to a common target value and then added back together (e.g., summed), to provide a spectrally balanced output.

In the method 1000 of FIG. 10, it is noted that the decomposition utilizes overlapping pass bands (e.g., overlapping band-pass filters) and generates copies of the data for each of the filters. In such an approach, each band-pass filter is applied to the same input data (e.g., a common set of data is utilized and each band-pass filtered is applied to that common set of data to provide an individual band-pass result, which may be referred to as band-passed data or band-pass filtered data).

As mentioned, the method 1000 can also include bluing, which may be applied to stretch well logs to time to generate the reflectivity sequence from the sonic and density log and then computes its spectrum. Statistically, such spectra are seldom white, with approximately the same values at about 10 Hz and at about 100 Hz, but rather tend to be blue, for example, with larger magnitude spectral components at higher (bluer) frequencies than at lower (redder) frequencies (e.g., consider visual electromagnetic energy spanning a range from infrared ("redder") to ultraviolet "bluer").

Spectral balancing can aim to modify a seismic trace spectrum so that it approximates the well log reflectivity spectrum within a measured seismic bandwidth. Such balancing can be achieved at least in part by multiply each band-pass filtered and AGC'd component by $\exp(+\beta f)$, where f is the center frequency of the filter and $\beta$ is a parameter that may be derived from well logs where the value thereof may, for example, vary between about 0 and about 0.5.

In the example of FIG. 10, the method 1000 balances the measured seismic data, which is the sum of the signal plus noise (i.e., noise is also processed). As explained, the method 1000 applies a number of band-pass filters on a trace by trace basis, which tends to make it inappropriate as input to more quantitative amplitude sensitive analysis such as AVO and post-stack or pre-stack inversion. In the method 1000, where an AGC window is too small or the statistics of the reflectivity sequence insufficiently smooth (an end member example may be coal bed cyclothems and sabkha sequences), then reflectors of interest may be suppressed and artifacts may be created.

As an example, a method can include estimating the spectrum of the signal via cross-correlates to adjacent traces, which may help to differentiate that part of the signal that is consistent (signal) and that part that is inconsistent (random noise). In such an example, spectral balancing parameters (AGC coefficients) may be based on the consistent part of the data; noting that such an approach may remove geology if the spectra are not sufficiently smooth.

Figure 11:
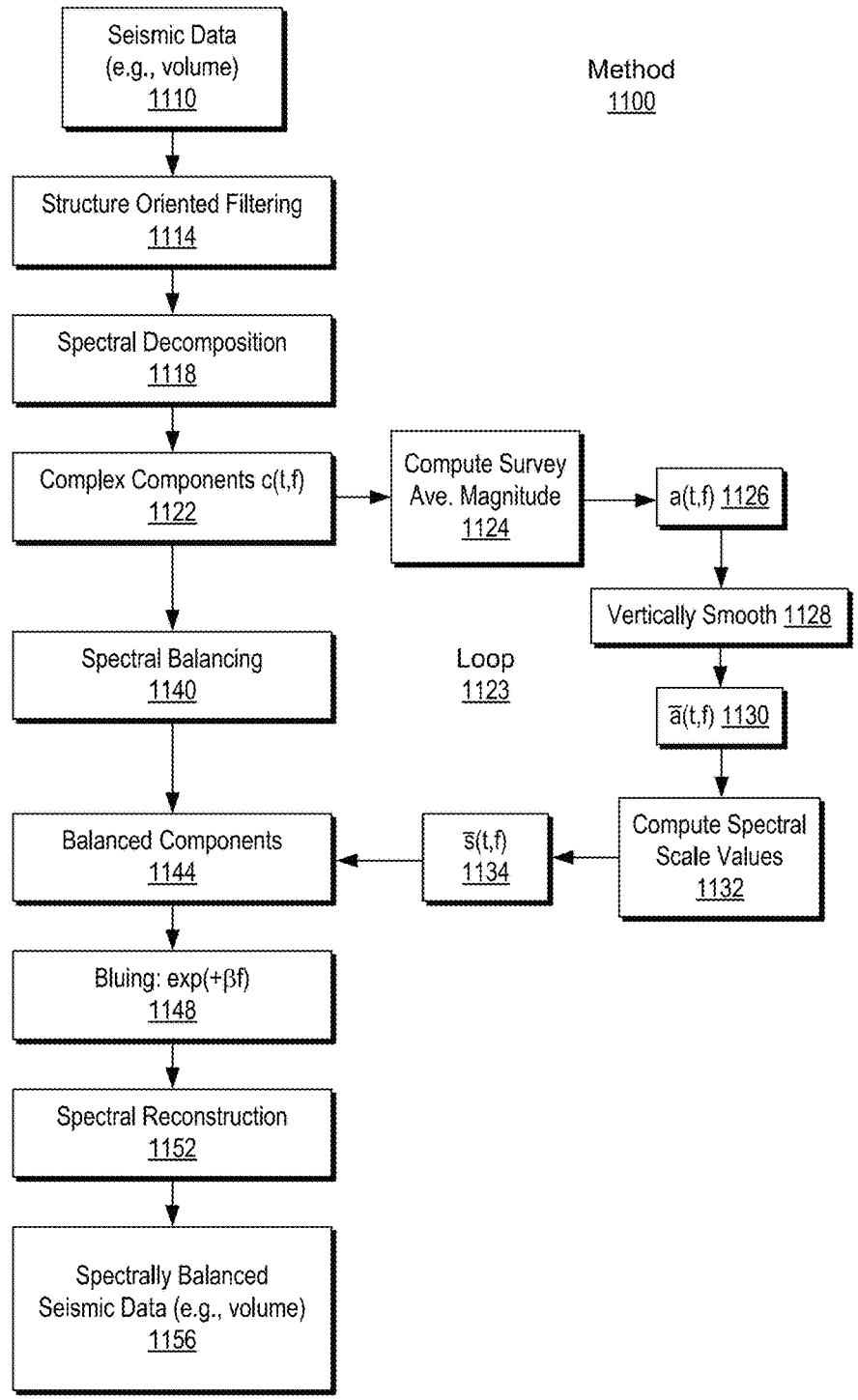
FIG. 11 illustrates an example of a method.

FIG. 11 shows an example of a method 1100 that may be applied to post-stack and/or pre-stack migrated data volumes. In such an example, the method 1100 can include suppressing crosscutting noise using a structure-oriented filtering algorithm, which aims to leave mostly signal in the data. Next, the data can be decomposed into time-frequency spectral components. Then, the method 1100 can compute a smoothed average spectrum. In such an approach, if the survey has sufficient geologic variability within the smoothing window (e.g., without perfect "railroad tracks"), the spectrum is representative of the time-varying source wavelet. This single average spectrum may be utilized to design a single time-varying spectral scaling factor that is applied to individual traces. In such an example, geologic tuning features and amplitudes may be more readily preserved.

As shown in FIG. 11, the method 1100 includes a reception block 1110 for receiving seismic data (e.g., as volume data), a structure oriented filtering block 1114 for structure oriented filtering, a spectral decomposition block 1118 for decomposing a spectrum, and a complex component computation block 1112 for computing complex component values for a loop 1123 that includes a computation of survey average magnitude block 1124 for computing average magnitude values, an output block 1126 for outputting the average magnitude values, a vertical smoot block 1128 for vertical smoothing of the average magnitude values, an output block 1130 for outputting the vertically smoothed average magnitude values, a computation of spectral scale values block 1132 for computing spectral scale values, and an output block 1134 for outputting the spectral scale values.

As shown in FIG. 11, method 1100 includes a spectral balancing block 1140 where output from the loop 1123 and the spectral balancing block 1140 are combined in a balanced components block 1144. Such balanced component may then be subjected to bluing per a bluing block 1148 followed by spectral reconstruction via a spectral reconstruction block 1152. As shown, the method 1110 can include an output block 1156 to output spectrally balanced seismic data (e.g., as volume data).

In a method such as, for example, the method 1000 or the method 1100, wavelet estimation may be considered to be "blind" where it includes estimating the amplitude spectrum of the seismic data under an assumption that the phase spectrum is zero (i.e. zero-phase seismic data). In such a method, the amplitude spectrum may be found through auto-correlation of the input trace with itself, or through investigations of the Fourier Transform of the input data. Such approaches assume that frequencies have the same relative amplitude level across the investigation data window. Such an assumption, however, can be inadequate, for example, due to anelastic attenuation in the underground, which effectively is an earth filter where the filter strength is a function of the number of oscillations/cycles through the underground. In other words, a subterranean formation can act as a filter where high frequencies will be attenuated quicker and stronger than low frequencies.

In a continuous wavelet transform (CWT) approach, wavelet amplitude spectrum estimation allows an individual frequency to have its own individual vertical analysis window length, which may be, for example, a function of wavelength for each frequency. As mentioned, if band-pass filtering is performed in a Fourier/frequency domain, then that is a classic approach (e.g., a Fourier approach); whereas, if band-pass filtering is performed in a time domain (e.g., through the convolution of a series of short-window filter wavelets, where window length is a function of the frequency), then that is a CWT approach.

In a classic approach (e.g., a Fourier approach) and in a CWT approach, various frequency bands can be overlapping due to a finite length data series, which can confound isolation of individual frequencies.

Figure 12:
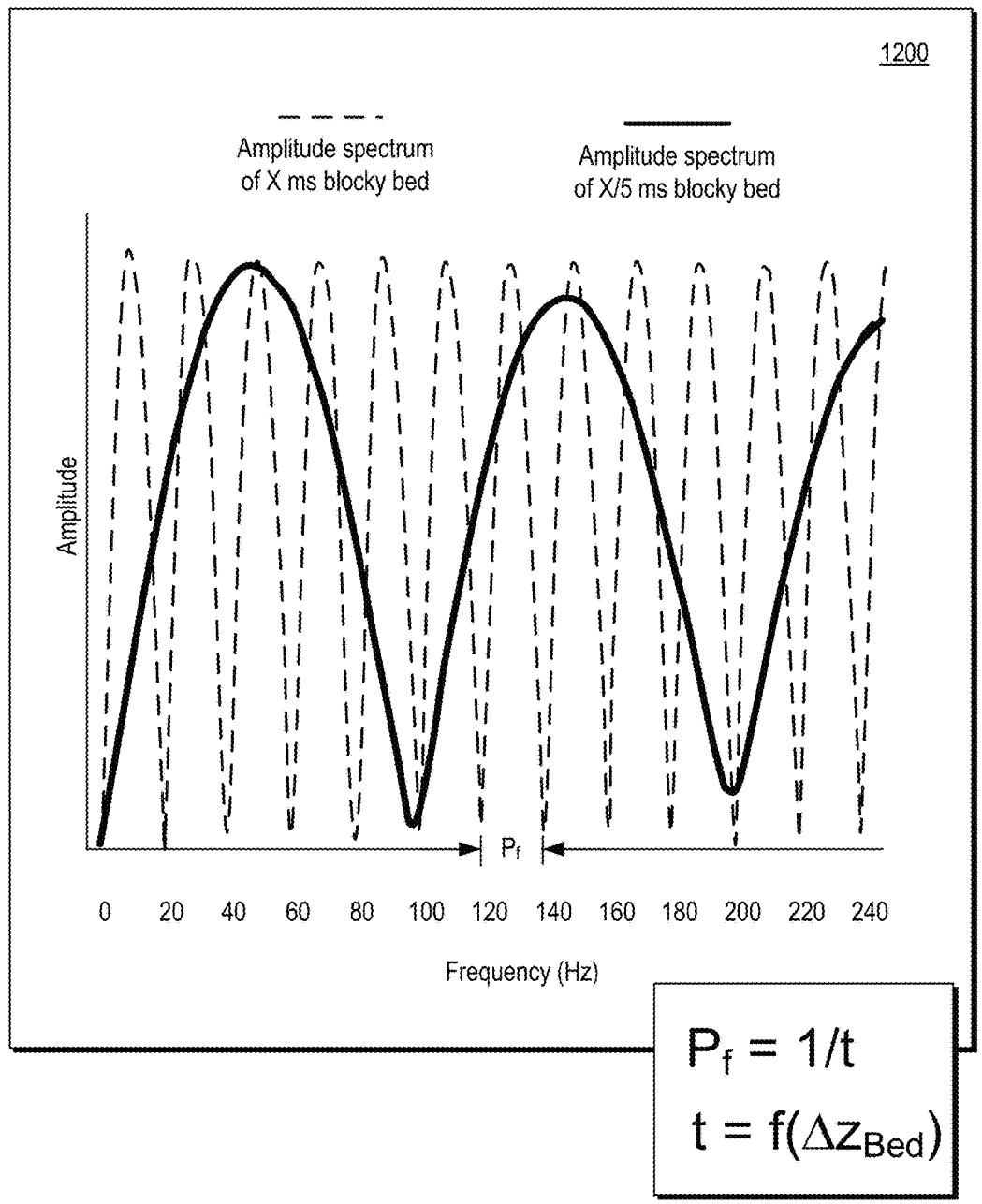
FIG. 12 illustrates an example of a plot.

FIG. 12 shows a plot 1200 of amplitude versus frequency for data associated with two beds, a first bed with a temporal thickness X ms and a second bed with a temporal thickness of X/5 ms (e.g., one-fifth that of the first bed). As shown, the temporal thickness determines the period of notching in the amplitude spectrum ($P_f$) with respect to frequency where, Pf=1/t and where t is the temporal thickness of a bed (e.g., a function of ΔzBed).

As an example, a CWT band-pass filter may be represented in a amplitude versus frequency domain. In such an example, the CWT band-pass filter may be represented as varying in amplitude to a peak at a characteristic frequency and as including a base that spans a range of frequencies such that a band may be defined, for example, consider specifying a CWT band-pass frequency as follows: CWT(f, Δf).

Figure 13:
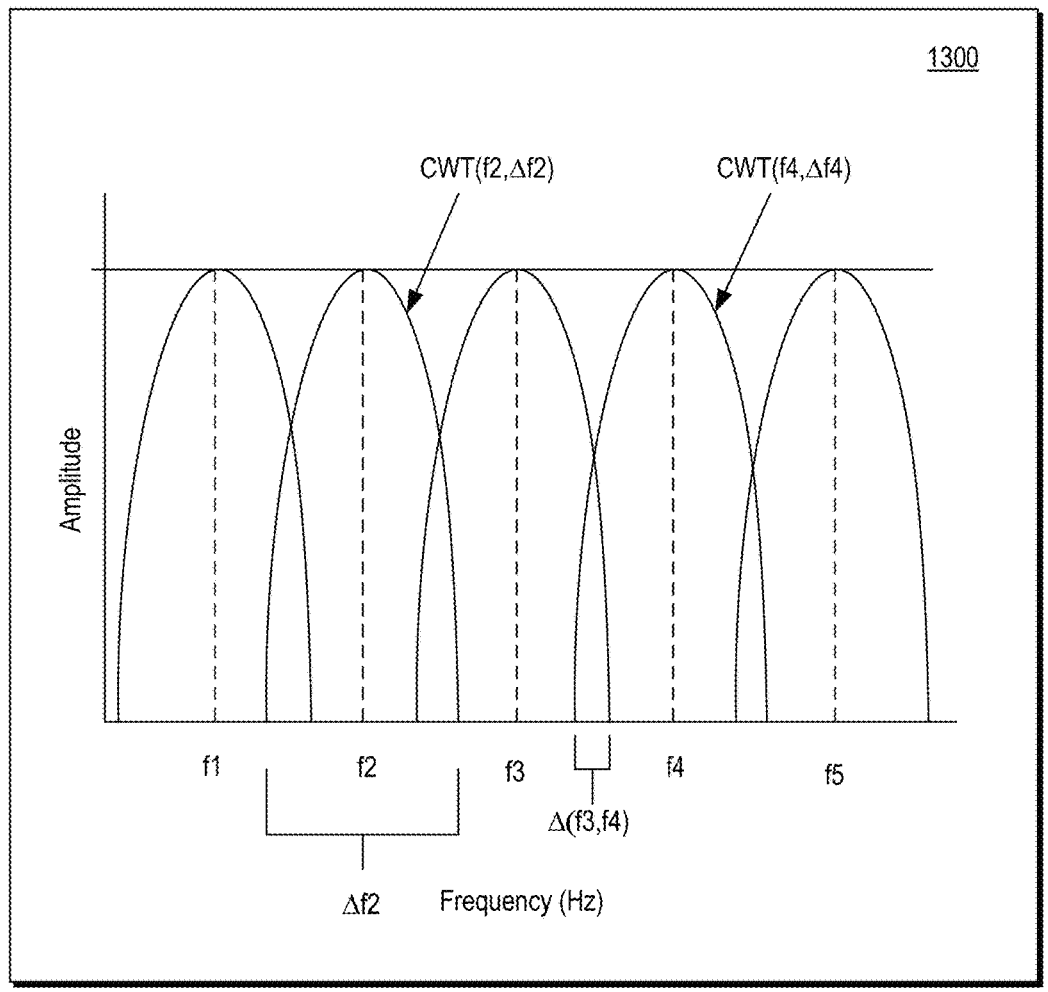
FIG. 13 illustrates an example of a plot.

FIG. 13 shows a plot 1300 of a plurality of CWT band-pass filters in a frequency domain. The plot 1300 shows how spectral decomposition may be applied where some amount of overlap exists between adjacent band-pass filters. For example, for a band-pass filter, amplitude can increase to a frequency peak where a corresponding base (e.g., at approximately zero amplitude) spans a range below and above the frequency peak. In such an example, an overlap can exist between adjacent frequency regions of band-pass filters in an amplitude versus frequency space (e.g., frequency domain) such as, for example, the overlap Δ(f3,f4).

As mention, in the example of FIG. 13, the individual band-pass filters are shown as CWT band-pass filters. The continuous wavelet transform (CWT) can compute the inner product of a signal as a function of time, with translated and dilated versions of an analyzing wavelet. As an example, the CWT as a frequency-based filtering of the signal can be represented by rewriting the CWT as an inverse Fourier transform, which includes Fourier transforms of the signal and the wavelet. As an example, stretching a wavelet in time causes its support in the frequency domain to shrink. In addition to shrinking the frequency support, the center frequency of the wavelet shifts toward lower frequencies. For CWT, the width of a band-pass filter is inversely proportional to scale where the width of a CWT filter decreases with increasing scale. This follows from the uncertainty relationships between the time and frequency support of a signal: the broader the support of a signal in time, the narrower its support in frequency.

A CWT approach tends to utilize a relatively short wavelet. For example, consider a Morlet/Gabor wavelet that may be an infinite cosine wave, of a given frequency, multiplied with a Gaussian windowing operator of a given wavelet length (e.g., a scale parameter). In such an example, the frequency of the carrier wavelet can be defined by the scale, ensuring a similar shape of the wavelet across octave ranges.

Due to this, relatively short wavelet length temporal resolution may be high, but poorer resolution may be found in the spectral domain.

In the scenario of FIG. 13, the sum of the input spectral components will differ from the input data in that the sum will approximately reconstruct the input data as adjacent band-pass filters can be expected to exhibit overlap.

As an example, a method can include subtracting a narrow-band component from input data (e.g., via a CWT band-pass filter) and computing a next spectral component (e.g., via a CWT band-pass filter) from a residual of the input data. For example, a residual can be residual data that is computed as the input data minus the spectral components extracted so far. Such an approach can, for example, reduce leakage between components and may help to ensure that, if the scaling function is 1.0 (e.g., as computed by the long-window AGC above) for the frequencies, then input data will be properly reconstructed.

As an example, consider the following example definitions as may be set forth in example code:

```
namespace Algo_Csharp_Script
{
class SpectralBalancingClass
{
//----------------------------------------------------------------
private static
   void exec ( )
   {
      maxNumThreads = 4 ; // Max number of cores to use (in parallel) . .
      .
      float firstFreq = 02 ; // Start frequency (in Hz) . . .
      float lastFreq = 30 ; // End frequency (in Hz) . . .
      float freqStep = 1 ; // Frequency increment (in Hz) . . .
      float maxScl = 15 ;
      // Maximum amplitude scaling factor for each frequency.
      NB: MaxScl == 1 => Bandpass mode . . .
      int numCycles = 10 ; // Number of cycles in the CWT filter . . .
      int latRad = 20 ; // Lateral radius for RMS3D operator . . .
      string survey = "IB2"; // Name of seismic survey of seismic cube . . .
      string cubeIn = "000_Seismic_Shape(5,8)"; // Name of seismic cube
      string cubeOut = "000_Seismic_Shape(5,8)_SpecBal(02,30,15,20)";
         // Name of spectrally balanced output cube . . .
      SpectralBalancing ( survey, cubeIn, firstFreq, lastFreq, freqStep,
         numCycles, maxScl, latRad, cubeOut );
      return;
   }
//----------------------------------------------------------------
private static
   void SpectralBalancing (
      string survey,      // Survey name . . .
      string inCube,      // Input seismic cube . . .
      float firstFreq,    // Start frequency (in Hz) . . .
      float lastFreq,     // End frequency (in Hz) . . .
      float freqStep,     // Frequency increment (in Hz) . . .
      int numCycles,      // Number of cycles in spec decomp . . .
      float maxScale,     // Maximum gain for individual frequencies . . .
      int latRad,         // Lateral radius for RMS operator . . .
      string outCube,     // Output seismic cube . . .
```

As an example, consider the following pseudo-code example that may be implemented as a method, a portion of a workflow, etc.

```
private void Compute ( )
{
   int ic = inData.GetLength(0); // Number of inlines in input cube
   int xc = inData.GetLength(1); // Number of cross-lines in input cube . . .
   int vc = inData.GetLength(2); // Number of time-slices in input cube . . .
//-------------------------------------------------------------
//
// Do spectral balancing . . .
//
//-------------------------------------------------------------
```

```
float[,,] outData = new float [ic, xc, vc];
float[,,] residual = new float [ic, xc, vc];
float[,,] gsdIn = new float [ic, xc, vc];
CopyCube ( inData, residual ) ; // residual = inData
ConstantCube ( outData, 0.0f ) ; // outData = 0.0
if ( maxScale == 1.0f ) // If bandpass mode . . .
  {
  for ( float f = firstFreq; f <= lastFreq; )
    {
    GSD     ( residual, gsdIn, sr, f, numCycles );
       // gsdIn    = GSD(residual, f)
    Difference ( residual, gsdIn, residual );
       // residual = residual - gsdIn
    Sum     ( outData, gsdIn, outData );
       // outData = outData + gsdout
    f = f + freqStep;
    }
  }
  else
  {
  int rmsNumCycles = Math.Max(10, numCycles);
     // Do a mimimum of 10 wavelengths vertically in RMS3D
  //------------------------------------------------------------
  //
  // First find max RMS amplitude . . .
  //
  //------------------------------------------------------------
  float[,,] maxCube = new float [ic, xc, vc];
  float[,,] rmsIn = new float [ic, xc, vc];
  for ( float f = firstFreq; f <= lastFreq; )
    {
    int vertRad = (int) Math.Min((500.0f / sr), (rmsNumCycles * 500.0f / ( f * sr )));
    GSD     ( residual, gsdIn, sr, f, numCycles);
       // gsdIn    = GSD(residual, f)
    RMS3D ( gsdIn, latRad, vertRad, rmsIn);
       // rmsIn    = RMS3D(gsdIn,latRad, vertRad)
    Difference ( residual, gsdIn, residual);
       // residual = residual - gsdIn
    MaxCube ( maxCube, rmsIn, maxCube);
       // maxCube = MAX(maxCube, rmsIn)
    f = f + freqStep;
    }
  //------------------------------------------------------------
  //
  // Then do balancing . . .
  //
  //------------------------------------------------------------
  float[,,] gsdOut = new float [ic, xc, vc];
  CopyCube ( inData, residual) ; // residual = inData
  for ( float f = firstFreq; f <= lastFreq; )
    {
    int vertRad = (int) Math.Min((500.0f / sr), (rmsNumCycles * 500.0f / ( f * sr )));
    GSD     ( residual, gsdIn, sr, f, numCycles);
       // gsdIn    = GSD(residual, f)
    RMS3D ( gsdIn, latRad, vertRad, rmsIn);
       // rmsIn    = RMS3D(gsdIn,latRad, vertRad)
    Difference ( residual, gsdIn, residual);
       // residual = residual - gsdIn
    ScaleCube ( gsdIn, rmsIn, maxCube, maxScale, gsdOut);
       // gsdOut = gsdIn * ( maxCube / rmsIn )
    Sum     ( outData, gsdOut, outData);
       // outData = outData + gsdout
    f = f + freqStep;
    }
  } // If do spectral balancing . . .
//------------------------------------------------------------
//
// Extract sub-cube . . .
//
//------------------------------------------------------------
int ic_sub = outDataFilt_sub.GetLength(0);
int xc_sub = outDataFilt_sub.GetLength(1);
int vc_sub = outDataFilt_sub.GetLength(2);
for ( int i = 0; i < ic_sub; i++)
  {
  for (int j = 0; j < xc_sub; j++)
    {
    for ( int k = 0 ; k < vc_sub; k++ )
      {
```

```
    outDataFilt_sub[i, j, k] = outData[i + di, j + dj, k + dk];
    outDataRes_sub[i, j, k] = residual[i + di, j + dj, k + dk];
      }
    }
  }
}
  return ;
}
//--------------------
} // End of class SpecBalancing_Server
```

In the foregoing pseudo-code, the portion to determine maximum RMS amplitude includes a loop for "f=f+ freqStep" and the portion to perform balancing includes a loop for "f=f+freqStep". These loops may commence with a first frequency and terminate with a last frequency. As an example, one or more other orders may be utilized as to frequency and looping. Or, for example, an algorithm may utilize parallel processing to perform calculations in parallel (e.g., for a number of frequencies simultaneously).

As indicated in the above example pseudo-code, a maxCube data structure is used that is dimensioned as follows maxCube=new float [ic, xc, vc] where ic, xc and vc are inline, crossline and time slice integer values that specify a number of inlines (inline count=>ic), a number of crosslines (cross-line count=>xc) and a number of samples vertically (vertical count=>vc) in a 3D dataset being processed and where a gsdOut data structure is used that is dimensioned as follows gsdOut=new float [ic, xc, vc]. The maxCube data structure includes maximum amplitude values for a seismic volume and the gsdOut data structure includes values that are based on values in the maxCube data structure gsdOut=gsdIn*(maxCube/rmsIn) where gsdIn=GSD(residual, f) and where residual is residual=residual−gsdIn. The data structure gsdOut is utilized as follows in a summation operation outData=outData+gsdout of the balancing portion of the pseudo-code.

The pseudo-code thus determines local RMS amplitude maxima on a using a frequency (e.g., frequency band) loop according to a residual data analysis basis and then determines generalized spectral decomposition (GSD) values according to a residual analysis basis based at least in part on the local RMS amplitude maxima where a summation operation sums those values in a frequency (e.g., frequency band) loop to output a spectrally balanced data structure outData, which is dimensioned in the pseudo-code according to inline, crossline and time slice indexes.

Figure 14:
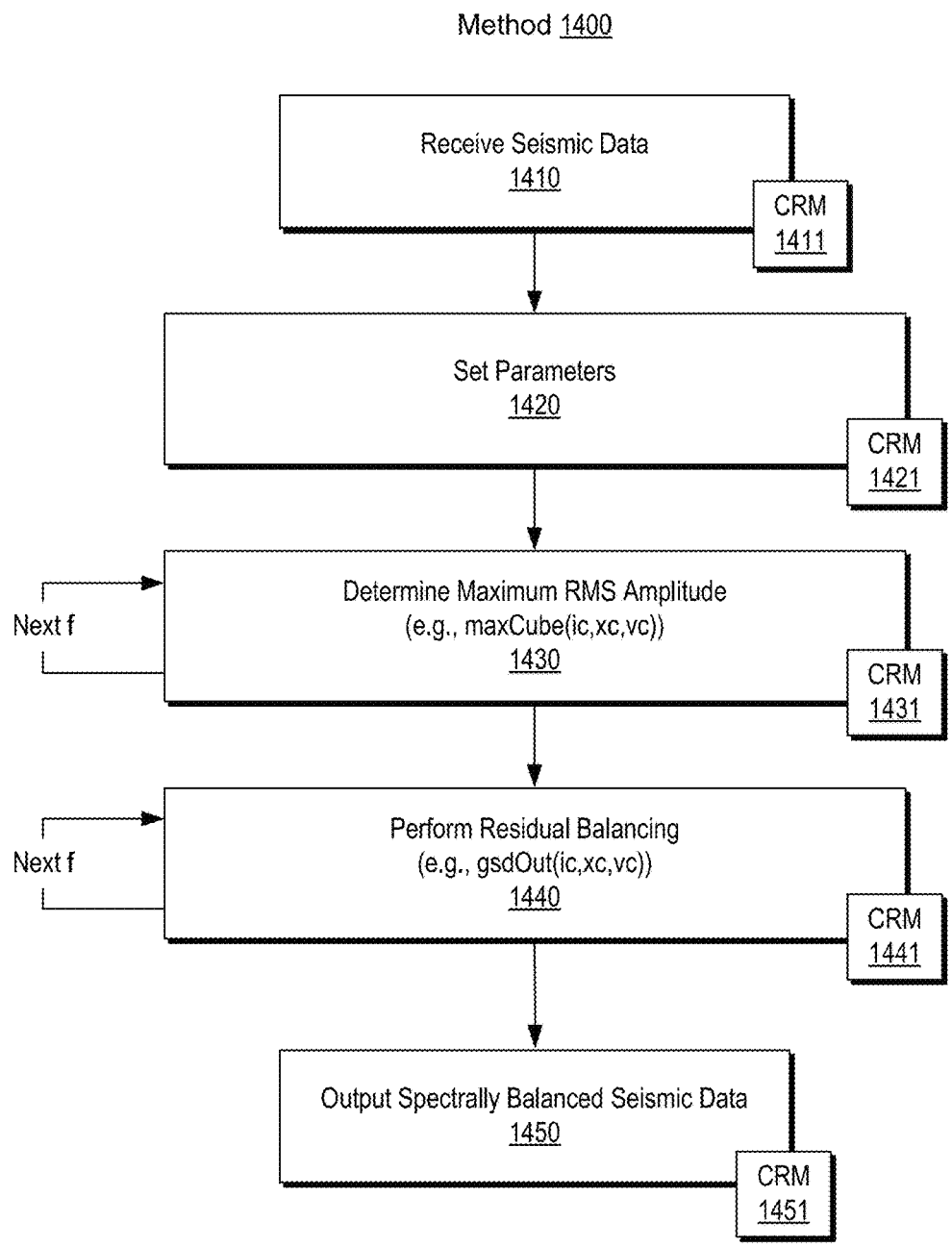
FIG. 14 illustrates an example of a method.

FIG. 14 shows an example of a method 1400 that includes a reception block 1410 for receiving seismic data, a set block 1420 for setting parameters associated with residual balancing, a determination block 1430 for determining maximum RMS amplitude, a performance block 1440 for performing residual balancing based at least in part on determined maximum RMS amplitude and an output block 1450 for outputting spectrally balanced seismic data.

Referring again to the method 1000 of FIG. 10, the band-pass filter block 1020 with the individual band-pass filters 1032 applies to the received trace such that each of the individual band-pass filters 1032 is applied to an entire bandwidth of information. In the example method 1400, after extraction of information associated with a frequency from input data (e.g., via application of a CWT band-pass filter), that information can be subtracted from the input data. In such an approach the subtracted information does not "pollute" the remaining information (e.g., residual data) that is processed to extract additional information associated with additional frequencies (e.g., per subsequent application of CWT band-pass filters).

As an example, the method 1400 may be implemented as a non-overlapping CWT spectral balancing technique. For example, as explained with respect to FIG. 13, data may be processed to avoid or minimize effects of overlap as to bands as may be implemented, for example, via band-pass filters.

As an example, the method 1400 of FIG. 14 can help to reduce effects of leakage or bleeding between channels. As an example, such a method may select a starting position with respect to frequency and operate in one or more directions from the starting position. For example, a method may commence from a frequency that is within a bandwidth and progress from that frequency to higher frequencies of the bandwidth and from that frequency to lower frequencies of the bandwidth.

As an example, a method can be iterative where individual frequency bands are successively removed from input data. As an example, a method can include subtracting each narrow-band component from input data as each of these narrow-band components is computed where a next spectral component is computed from residual data, for example, where the residual data is the input data minus the spectral components extracted so far (e.g., for a given direction of progression through data). Such an approach can reduce leakage or bleeding between components. As an example, an order may be random where a group of frequencies is handled randomly where subtraction occurs for extracted information prior to assessing a subsequent component.

As shown, the method 1400 can include a loop with respect to the determination block 1430 where frequency (f) can be looped and can include a loop with respect to the performance block 1440 where frequency (f) can be looped. For example, the method 1400 can progress from a low frequency to a high frequency according to a frequency increment or can progress from a high frequency to a low frequency according to a frequency decrement. As an example, an approach may consider a range of frequencies associated with particular structure or structures. As an example, the method 1400 may perform residual balancing on a portion of frequencies.

As an example, the determination block 1430 may operate on a plurality of traces. For example, seismic data for a plurality of traces that define a neighborhood may be utilized to calculate a gain function over the neighborhood. As an example, an RMS value may be calculated using a window over a neighborhood of neighboring traces, which allow for considering the determination block 1430 as applying a 3D operator. As shown in FIG. 14, the determination block 1430 may output a data structure maxCube (see, e.g., pseudo-code example).

As an example, the performance block 1440 can include performing residual balancing via calculations that include subtracting a narrow-band component from input and computing a next spectral component from a residual. For example, a residual can be residual data that is computed as input data minus one or more spectral components extracted (e.g., from 0 to N, from N to 0, etc.).

Such an approach can, for example, reduce leakage between components and may help to ensure that, if the scaling function is about 1.0 (e.g., as computed by the long-window AGC above) for the frequencies, that input data can be acceptably reconstructed. As shown in FIG. 14, the performance block 1440 may generate a data structure gsdOut that is utilized in a summation operation outData (see, e.g., pseudo-code example).

As an example, a method may employ parallel processing, for example, as to calculation of a gain function. In such an example, various regions may be selected and operated upon to determine, for example, maximum amplitude values (e.g., maximum RMS amplitude values) for the regions where each region may be processed by a corresponding core, processor, etc. As an example, a method may employ virtualization such that a core, a processor, an instance of an operating system and an application may be virtual (e.g., implemented via a virtual machine).

The method 1400 is shown in FIG. 14 in association with various computer-readable media (CRM) blocks 1411, 1421, 1431, 1441, and 1451. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1400. As an example, a CRM block can be a computer-readable storage medium that is non-transitory, not a carrier wave and not a signal. As an example, such blocks can include instructions that can be stored in memory such as the memory 258 of the system 250 and can be executable by one or more of the processors 256 of the system 250.

As an example, the method 1400 may be implemented using a framework. For example, consider the PETREL® framework that can be implemented using one or more computing devices (see, e.g., the system 250). As an example, such a framework may include one or more plug-ins (see, e.g., the block 270 of the system 250). As an example, one or more portions of the method 1400 may be implemented via one or more plug-ins. As an example, a plug-in may be a PETREL® framework plug-in or an OCEAN® framework plug-in. As an example, output from a method such as the method 1400 may be utilized in planning such as, for example, well planning. As an example, well planning can include constructing trajectories for a well or wells where the well or wells may be for injection and/or production. As an example, a well can be planned according to a trajectory that extends to a region in a subterranean environment that may be a reservoir region. As an example, such a region may be identified via an interpretation workflow where, for example, seismic data is processed to generated spectrally balanced seismic data, which may be rendered to a display, etc.

Figure 15:
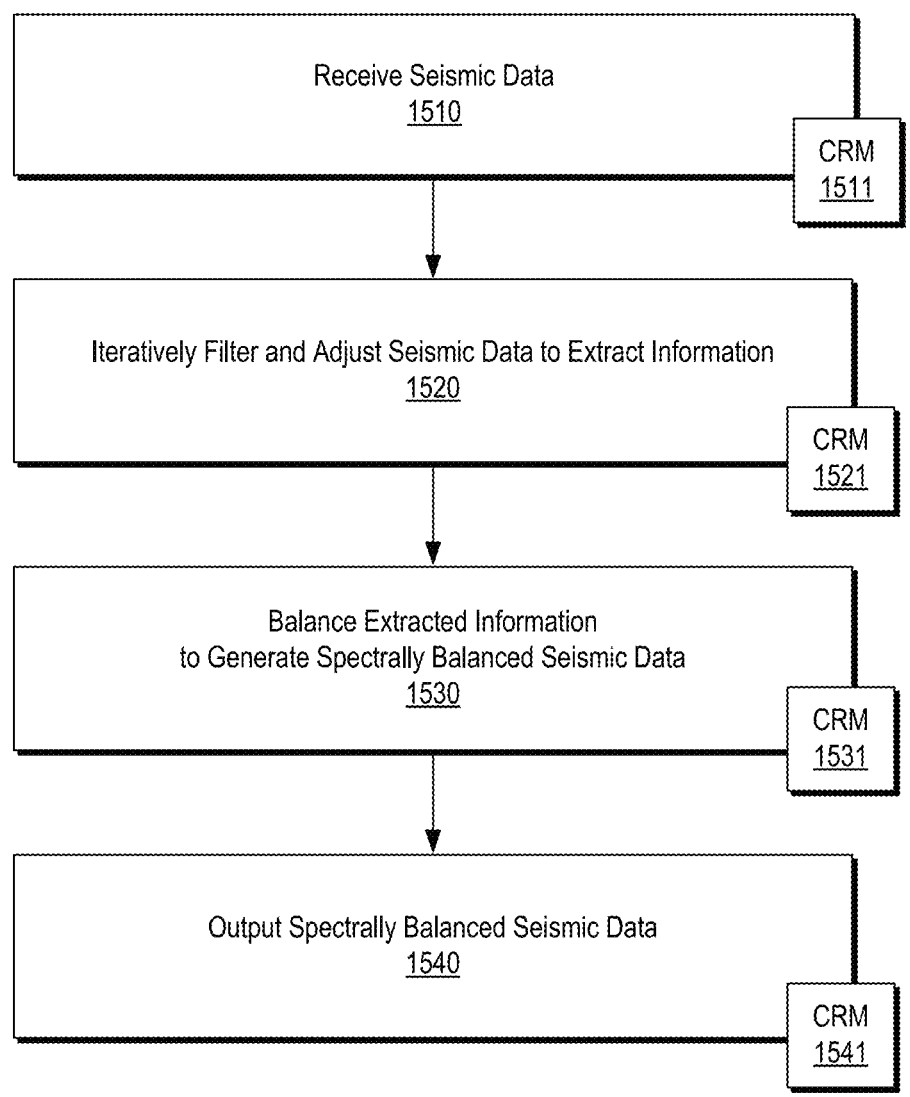
FIG. 15 illustrates an example of a method.

FIG. 15 shows an example of a method 1500 that includes a reception block 1510 for receiving seismic data that has an associated bandwidth; an iterative filter and adjust block 1520, for a number of frequency bands, iteratively filtering and adjusting the seismic data by applying band-pass filters to extract information associated with each of the frequency bands where the adjusting the seismic data includes, after each iteration, subtracting extracted information from the seismic data prior to a subsequent iteration; a balance block 1530 for balancing the extracted information to generate spectrally balanced seismic data; and an output block 1540 for outputting the spectrally balanced seismic data. As an example, the output block 1540 may output spectrally balanced seismic data by rendering at least a portion of the data to a display. For example, a computing device may be operatively coupled to a display or may include a display where graphics circuitry may be utilized (e.g., GPU or GPUs, etc.) to render data to the display. As an example, data may be output to one or more storage devices, optionally via one or more interfaces, which may include one or more network interfaces.

As an example, the method 1500 may be implemented as a workflow or as a portion of a workflow. As an example, a workflow may be a seismic data interpretation workflow that aims to identify structural features in a subterranean environment.

The method 1500 is shown in FIG. 15 in association with various computer-readable media (CRM) blocks 1511, 1521, 1531 and 1541. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1500. As an example, a CRM block can be a computer-readable storage medium that is non-transitory, not a carrier wave and not a signal. As an example, such blocks can include instructions that can be stored in memory such as the memory 258 of the system 250 and can be executable by one or more of the processors 256 of the system 250.

As an example, the method 1500 may be implemented using a framework. For example, consider the PETREL® framework that can be implemented using one or more computing devices (see, e.g., the system 250). As an example, such a framework may include one or more plug-ins (see, e.g., the block 270 of the system 250). As an example, one or more portions of the method 1500 may be implemented via one or more plug-ins. As an example, a plug-in may be a PETREL® framework plug-in or an OCEAN® framework plug-in. As an example, output from a method such as the method 1500 may be utilized in planning such as, for example, well planning. As an example, well planning can include constructing trajectories for a well or wells where the well or wells may be for injection and/or production. As an example, a well can be planned according to a trajectory that extends to a region in a subterranean environment that may be a reservoir region. As an example, such a region may be identified via an interpretation workflow where, for example, seismic data is processed to generated spectrally balanced seismic data, which may be rendered to a display, etc.

As an example, a vertical radius may be utilized as a scaling operator, which may be, for example, an RMS scaling operator, an envelope operator, a mean operator, a norm function operator, etc. As an example, a scaling operator can be utilized to estimate energy level (e.g., amplitude level) for a frequency and can be a function of wavelength for a frequency. As an example, a vertical radius may be selected to be of a length that is a minimum of about 10 oscillations. As an example, a user may select a length, optionally based on a number of oscillations. As an example, a numerical minimum may be about 1 and a practical minimum may be about 3. As an example, a length may be time based, for example, about 1 second long, which may be an approximate maximum.

As an example, a method can include a generalized spectral decomposition (GSD). For example, a CWT filter process can be a GSD. As an example, a CWT filter can be of one or more families of filters (e.g., Gabor, Morley, Ricker, etc.) where, for example, the CWT filter can be zero-phase (e.g., does not alter the phase of components of an input signal).

As an example, a wavelet may be generated using sampled data that includes a plurality of samples. As an example, such a wavelet can include a number of oscillations per sampling unit and a length of the wavelet can correspond to the number of oscillations. As an example, such a wavelet may be time-shifted. As an example, a wavelet may be scaled such that the samples proximate to one or both ends of the wavelet decay toward zero. As an example, scaling can aim to ensure that amplitude at a peak frequency of the wavelet, upon transformation to a Fourier domain, is substantially unity.

As an example, a method may allow a user to generate a wavelet with a flexible design that may be used for the filtering/decomposition of input seismic data. Such a method may be or include a generalized spectral decomposition (GSD) method where, for example, one or more parameter values may control vertical resolution and/or frequency resolution. As an example, consider a wavelet defined based on three parameters: (1) frequency, (2) number of cycles, and (3) phase. As an example, a resulting raw wavelet may be scaled such that the correlation of the scaled wavelet with itself (e.g., auto-correlation) is approximately unity.

As an example, a CWT filter can be a GSD kernel. For example, consider an approach that estimates a distance between top and bottom reflectors as a time of about 35 milliseconds and a frequency for a channel embedded between the two reflectors as about (1000/(2*35 ms)), which is about 14 Hz. In such an example, the wavelet shape that correlates well with this channel body may be a wavelet kernel with a central frequency of about 14 Hz and a phase of about +90 degrees. As such, a method may include building or constructing a wavelet (e.g., a time-series of sample values) in the shape of an array with an oscillating shape based upon seismic data. For example, a shape of a wavelet may be sinusoidal and may be a cosine wave.

As to scaling, one or more techniques may be implemented. As an example, a scaling technique may aim to avoid boosting noise, which may be assumed to be lower-amplitude than signal.

As an example, consider the following pseudo-code as to a scaling technique (see, e.g., ScaleCube in foregoing example of pseudo-code).

```
private static
    void ScaleCube ( float[, ,] inData, float[, ,] rmsData, float[, ,] maxData,
float maxScl, float[, ,] outData )
{
    int ic = inData.GetLength(0);
    int xc = inData.GetLength(1);
    int vc = inData.GetLength(2);
    float w = 1.0f / maxScl
    for ( int i = 0 ; i < ic; i++)
    {
        for( int j = 0 ; j < xc; j++)
        {
            for ( int k = 0 ; k < vc; k++)
            {
                float val = inData [i, j, k];
                float rms = rmsData [i, j, k];
                float max = maxData [i, j, k];
                float scl = Math.Min(maxScl, max / rms); // Scl1
```

-continued

```
                //float scl = max / rms + w*max); //Scl2
                //float scl = ( rms*max ) / ( rms*rms + w*max ); // Scl3
                outData[i, j, k] = scl val
            }
        }
    }
return;
}
```

As an example, such an approach to scaling can help to avoid one or more frequencies that are minimal in data or not in data. For example, one or more frequencies may not be in data and be in a null space. Consider a bandwidth that ranges from about 5 Hz to about 60 Hz where a frequency of 80 Hz is not in the data (e.g., no 80 Hz component). In such an example, a maximum RMS amplitude value of a sought after 80 Hz frequency component would be relatively small, for example, approximately zero. Where an attempt is made to boost such a small value, the scaling function may tend to a very large number (e.g., tend to infinity), which would be inappropriate. As an example, a method can implement a scaling algorithm that can reduce risks of boosting noise or other small energies with frequencies that do not correspond to meaningful signal.

As an example, a spatial smoothing filter may be applied to spectrally balanced seismic data. For example, high frequency noise may be to some extent boosted where filtering may be applied to diminish such noise. As an example, a filter may act to smooth trace to trace noise, though some amount of lateral resolution may be lost via such an approach.

As an example, a method can include various parameters such as, for example, one or more of begin frequency, end frequency, frequency increment/decrement (e.g., may be determined based on data, etc.), a number of oscillations in an operator (e.g., where a lower number may be more robust), and a maximum boost per frequency (e.g., selected to avoid boosting singularities).

As an example, one or more types of window operators may be utilized. For example, an approach may operate based on octaves. As an example, consider subtracting octaves via discretizations based on a first octave, a second octave, a third octave, etc. For example, consider a first octave from 2 Hz to 4 Hz, a second octave from 4 Hz to 8 Hz, a third octave from 8 Hz to 16 Hz, etc.

Figure 16:
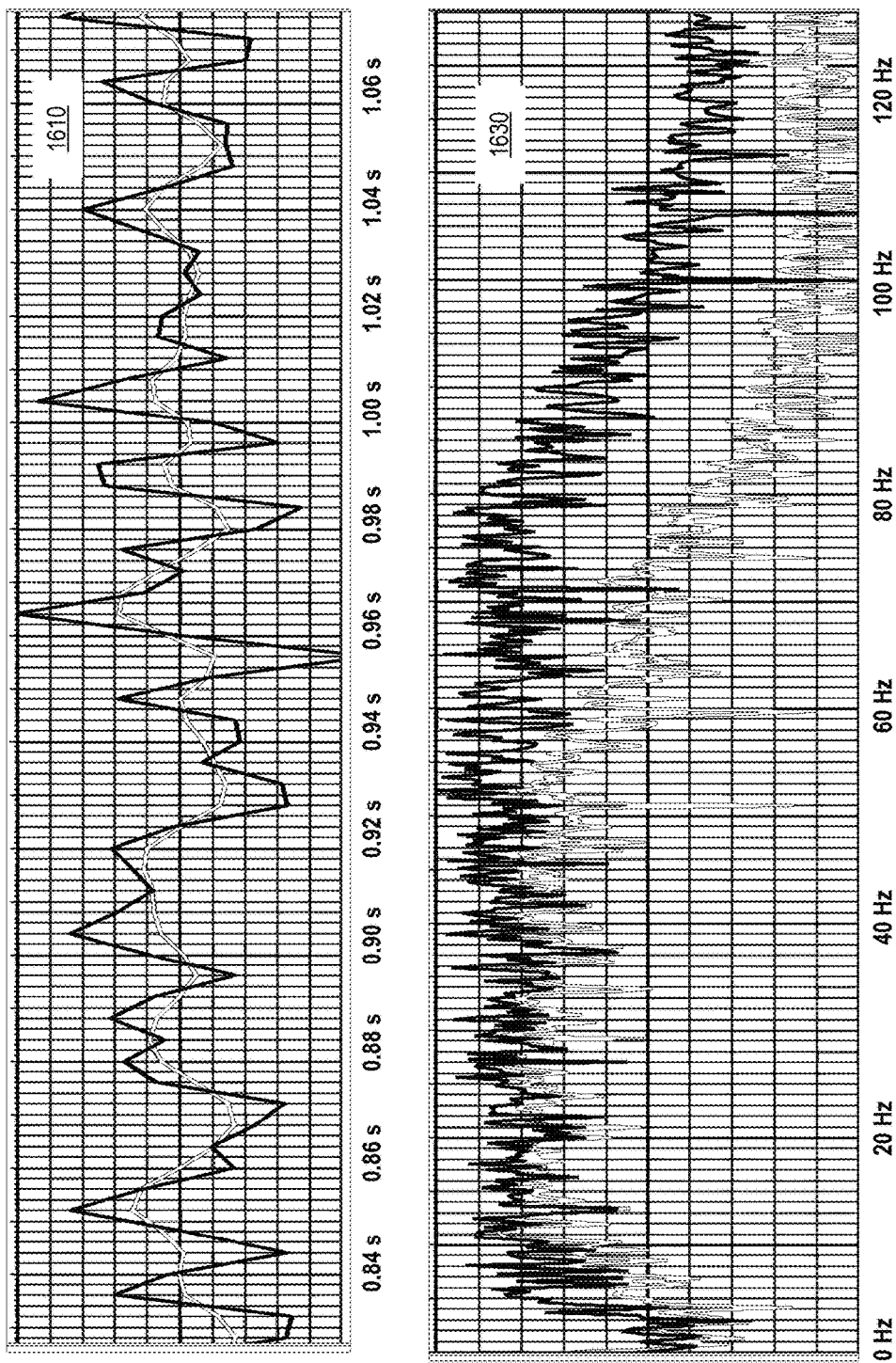
FIG. 16 illustrates examples of plots.

FIG. 16 shows example plots 1610 and 1630. Input seismic signal (open fill line) and output seismic signal (solid fill line), together with their respective amplitude spectrums. Note that although one intention can be to flatten an amplitude spectrum from about 0 Hz to about 90 Hz, in the plot 1630, the output signal starts to decay after about 80 Hz. Such a result can be due to the scaling function in this example being capped at a maximum of about 30× (approximately 30 dB) scaling of each input frequency band. As seen in FIG. 16, the input signal goes below −30 dB at approximately 78 Hz, which can be interpreted to mean that that an input frequency band above that frequency will not be fully scaled to the peak frequency amplitude, and can hence decay in the output result.

In FIG. 16, the plot 1630 shows that the black fill line (data post-processing) is relatively flat with respect to frequency. In contrast, the open fill line (input data) shows decay after about 45 Hz and it also decays below about 12 Hz. Thus, the black fill line shows output data as being spectrally whitened via spectral whitening of the input data.

As an example, a method may be adjusted to redden, blue, whiten, etc. a spectrum. Higher frequencies tend to be noisier than lower frequencies thus bluing can increase some amount of noise (e.g., amplitude of noise).

As an example, a method can include varying a frequency range temporally. For example, as the Earth can attenuate high frequencies more than low frequencies (e.g., anelastic attenuation effective as to attenuation of cycle count; e.g., consider one or more Q factors for one or more frequencies). Thus, signal from deep in a formation, a filter may be adjusted such that a high frequency cutoff decreases with respect to depth. Such an approach may aim to capture more of the frequency content as the upper range becomes attenuated with respect to depth.

In reflection seismology, the anelastic attenuation factor (e.g., seismic quality factor or Q (which is inversely proportional to attenuation factor), can quantify effects of anelastic attenuation on a seismic wavelet (seismic energy) caused, for example, by fluid movement and grain boundary friction. As a seismic wave propagates through a medium, the elastic energy associated with the wave can be gradually absorbed by the medium, eventually ending up as heat energy. Such absorption (e.g., or anelastic attenuation) can eventually extinguish a seismic wave.

Figure 17:
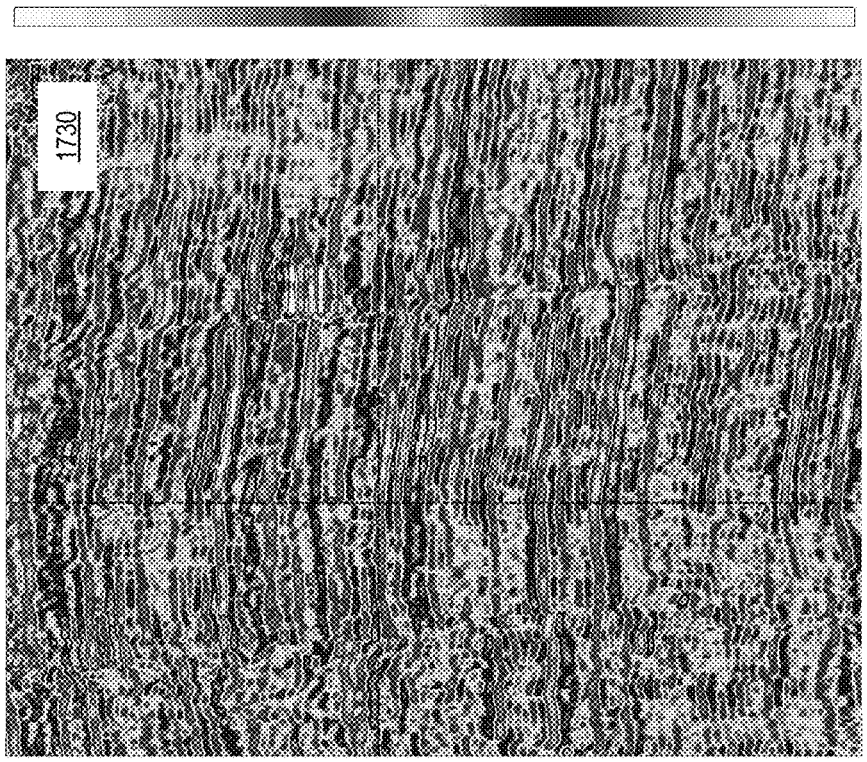
FIG. 17 illustrates examples of plots.
Figure 17:
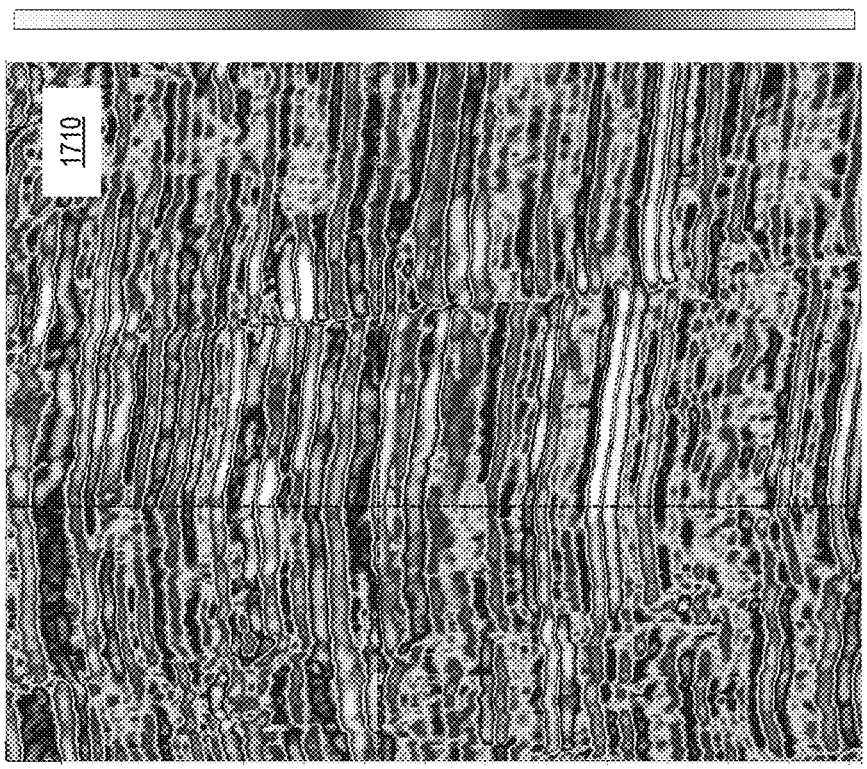

FIG. 17 shows example plots 1710 and 1730 for input data and output data, respectively. As can be seen via a comparison of the plots 1710 and 1730, the output data of the plot 1730 is of a finer resolution than the input data of the plot 1710. In particular, the vertical resolution of the data in the plot 1730 is finer than the vertical resolution of the data in the plot 1710.

Figure 18:
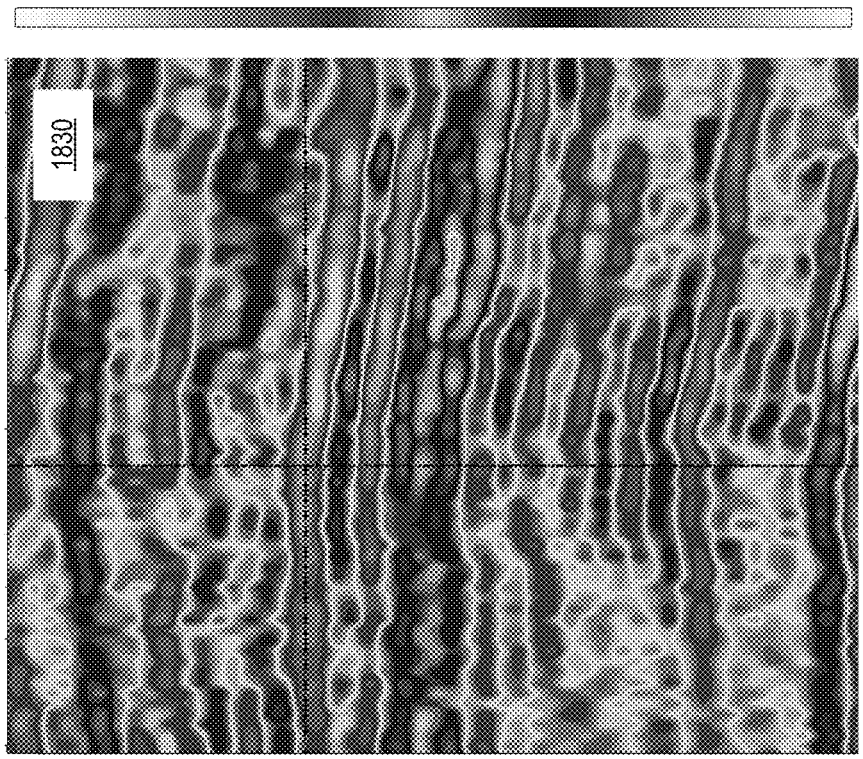
FIG. 18 illustrates examples of plots.
Figure 18:
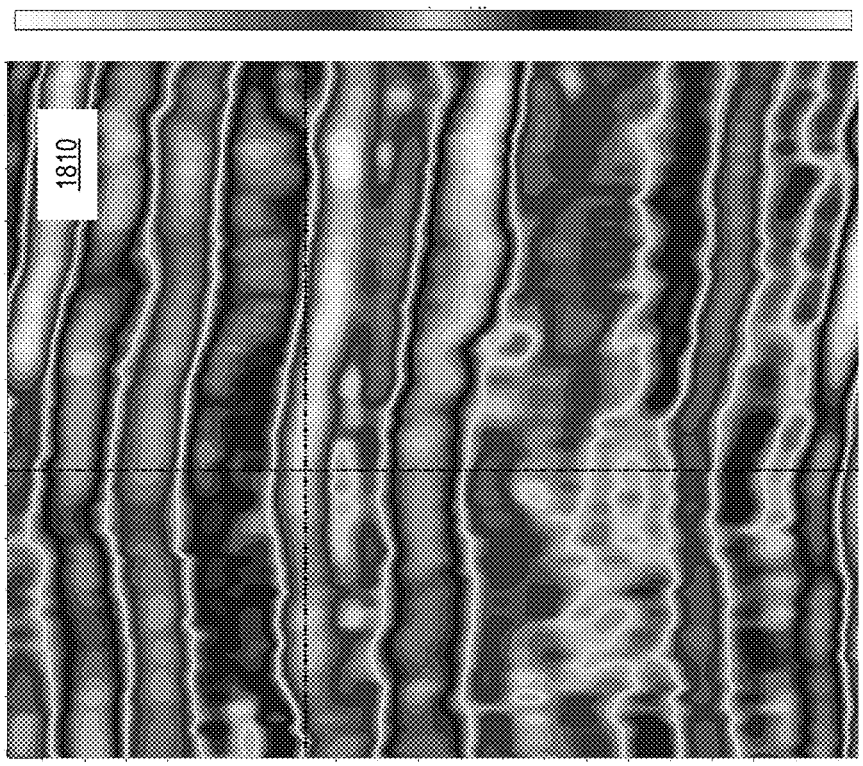

FIG. 18 shows example plots 1810 and 1830 that correspond to portions of the plots 1810 and 1830. As shown, the output data is of a higher resolution than the input data. The data in the plots 1830 and 1830 show that a method such as, for example, the method 1400 of FIG. 14, the method 1500 of FIG. 15, etc., can allow for finer resolution interpretation of interfaces and/or horizons in post-stack seismic data.

As an example, a method can include receiving seismic data that has an associated bandwidth; for a number of frequency bands, iteratively filtering and adjusting the seismic data by applying band-pass filters to extract information associated with each of the frequency bands where the adjusting the seismic data includes, after each iteration, subtracting extracted information from the seismic data prior to a subsequent iteration; balancing the extracted information to generate spectrally balanced seismic data; and outputting the spectrally balanced seismic data. In such an example, the method can include determining local amplitude maxima for the seismic data and balancing the extracted information based at least in part on the local amplitude maxima. As an example, balancing can include scaling, for example, scaling may include classifying noise as having a lower amplitude than signal in the seismic data.

As an example, a method can include filtering using band-pass filters that include continuous waveform transform (CWT) band-pass filters.

As an example, a method can include rendering at least a portion of spectrally balanced seismic data to a display. In such an example, the data may be rendered to the display as part of a workflow that includes interpreting seismic data, for example, to identify one or more structures in a subterranean environment. As an example, a workflow can include spectral balancing that allows an interpreter to see and interpret interfaces and/or horizons in processed post-stack seismic data. In such an example, one or more of the interfaces and/or horizons may not be visible or interpretable in the seismic data prior to processing to spectrally balance such seismic data.

As an example, a method can include generating spectrally balanced seismic data that includes a vertical resolution that exceeds a vertical resolution of seismic data from which the spectrally balanced seismic data has been generated.

As an example, a method that includes filtering via band-pass filters can include providing and/or generating a number of band-pass filters that can correspond to a number of frequency bands. In such an example, frequencies covered by the band-pass filters can span a frequency bandwidth associated with seismic data to be processed.

As an example, a method can include iterative filtering that progresses from a lower frequency band to a higher frequency band. As an example, a method can include iterative filtering that progresses from a higher frequency band to a lower frequency band. As an example, a method can include iterative filtering that progresses randomly.

As an example, a method for spectrally balancing seismic data can include receiving seismic data that is or includes post-stack seismic data.

As an example, a method for spectrally balancing seismic data can include decreasing an upper frequency cut-off limit with respect to increasing vertical depth. For example, such a method can include seismic data acquired for a subterranean environment that spans a vertical depth. Such data may be a seismic volume (e.g., volumetric seismic data, a seismic data cube, etc.). As an example, seismic data can be defined with respect to inline and cross-line directions as well as a depth direction, which can be a vertical depth direction. Where seismic waves travel in such a subterranean environment, rock can attenuate higher frequencies such that the deeper the seismic waves travel the more they are attenuated. As an example, energy associated with such attenuated frequencies may decrease to a level (e.g., as measured by amplitude) that may be of the order of noise. By decreasing an upper frequency cut-off limit, where energy is at such a level, it may be cut-off. As an example, a method may include decreasing a limit based at least in part on a Q factor. For example, a method can include decreasing a frequency cut-off limit based at least in part on one or more Q factors.

As an example, a system can include a processor; memory operatively coupled to the processor; and processor-executable instructions stored in the memory to instruct the system where the instructions include instructions to receive seismic data that has an associated bandwidth; for a number of frequency bands, iteratively filter and adjust the seismic data by application of band-pass filters to extract information associated with each of the frequency bands where to adjust the seismic data includes, after each iteration, to subtract extracted information from the seismic data prior to a subsequent iteration; balance the extracted information to generate spectrally balanced seismic data; and output the spectrally balanced seismic data. In such an example, the instructions can include instructions to determine local amplitude maxima for the seismic data and to balance the extracted information based at least in part on the local amplitude maxima. As an example, instructions to balance can include instructions to scale.

As an example, one or more computer-readable storage media can include computer-executable instructions to instruct a computer where the instructions include instructions to receive seismic data that includes an associated bandwidth; for a number of frequency bands, iteratively filter and adjust the seismic data by application of band-pass filters to extract information associated with each of the frequency bands where to adjust the seismic data includes, after each iteration, to subtract extracted information from the seismic data prior to a subsequent iteration; balance the extracted information to generate spectrally balanced seismic data; and output the spectrally balanced seismic data. In such an example, the instructions can include instructions to determine local amplitude maxima for the seismic data and to balance the extracted information based at least in part on the local amplitude maxima. As an example, instructions to balance can include instructions to scale.

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2.

Figure 19:
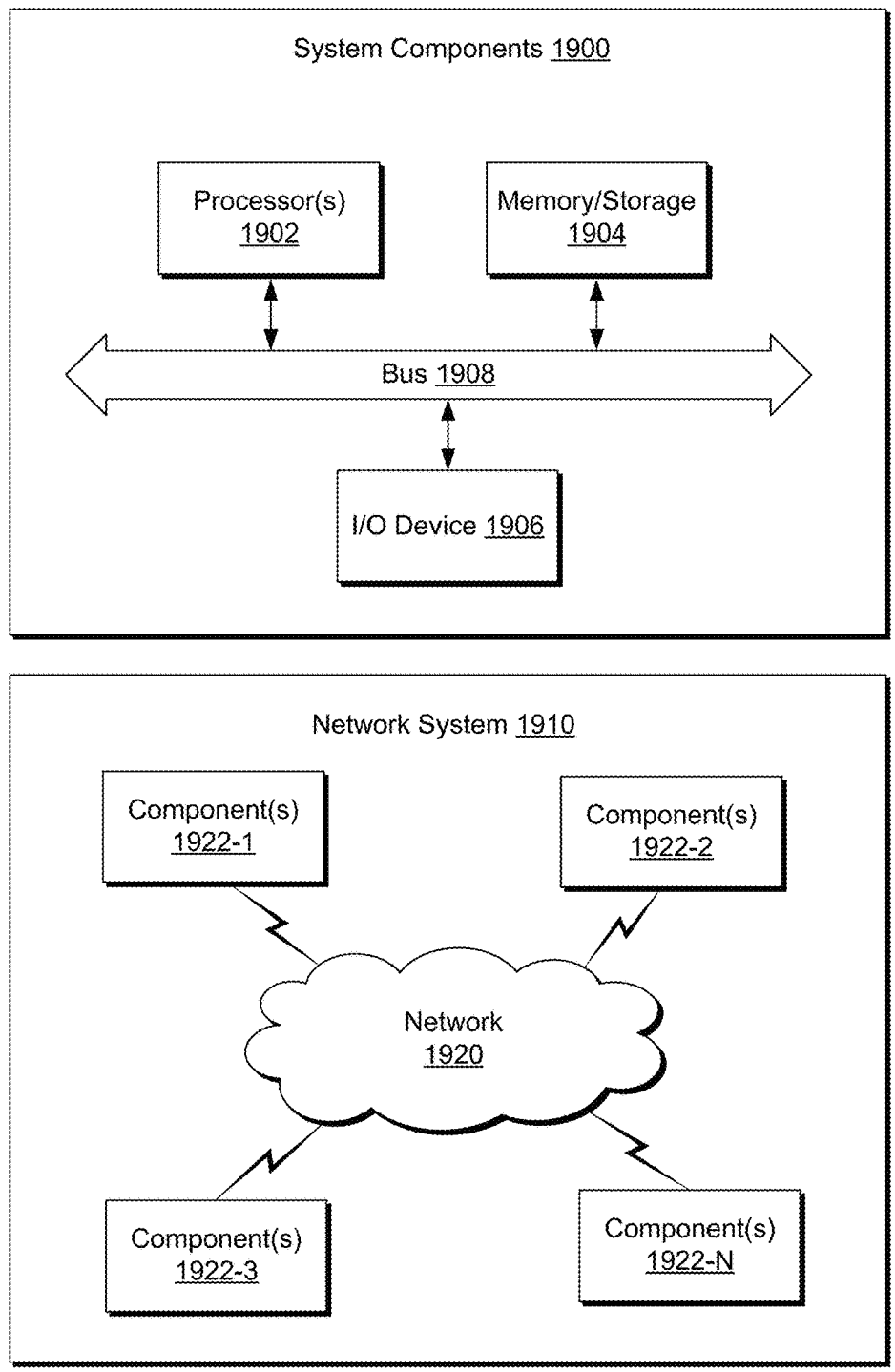
FIG. 19 illustrates example components of a system and a networked system.

FIG. 19 shows components of an example of a computing system 1900 and an example of a networked system 1910. The system 1900 includes one or more processors 1902, memory and/or storage components 1904, one or more input and/or output devices 1906 and a bus 1908. In an example embodiment, instructions may be stored in one or more computer-readable media (e.g., memory/storage components 1904). Such instructions may be read by one or more processors (e.g., the processor(s) 1902) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 1906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1910. The network system 1910 includes components 1922-1, 1922-2, 1922-3, . . . 1922-N. For example, the components 1922-1 may include the processor(s) 1902 while the component(s) 1922-3 may include memory accessible by the processor(s) 1902. Further, the component(s) 1922-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

The invention claimed is:

1. A method comprising:
   receiving seismic data that comprise an associated bandwidth;
   for a number of frequency bands, iteratively filtering and adjusting the seismic data by applying band-pass filters to extract information associated with each of the frequency bands wherein the adjusting the seismic data comprises, after each iteration, subtracting extracted information from the seismic data prior to a subsequent iteration to form residual seismic data for filtering by the subsequent iteration;
   balancing the extracted information to generate spectrally balanced seismic data; and
   outputting the spectrally balanced seismic data.

2. The method of claim 1 comprising determining local amplitude maxima for the seismic data and balancing the extracted information based at least in part on the local amplitude maxima.

3. The method of claim 1 wherein the balancing comprises scaling.

4. The method of claim 3 wherein scaling comprises classifying noise as having a lower amplitude than signal in the seismic data.

5. The method of claim 1 wherein the band-pass filters comprise continuous wavelet transform band-pass filters.

6. The method of claim 1 comprising rendering at least a portion of the spectrally balanced seismic data to a display.

7. The method of claim 1 wherein the spectrally balanced seismic data comprise a vertical resolution that exceeds a vertical resolution of the seismic data.

8. The method of claim 1 wherein a number of band-pass filters corresponds to the number of frequency bands.

9. The method of claim 1 wherein the iteratively filtering progresses from a lower frequency band to a higher frequency band.

10. The method of claim 1 wherein the iteratively filtering progresses from a higher frequency band to a lower frequency band.

11. The method of claim 1 wherein the iteratively filtering progresses randomly.

12. The method of claim 1 wherein the seismic data comprise post-stack seismic data.

13. The method of claim 1 comprising decreasing an upper frequency cut-off limit with respect to increasing vertical depth.

14. The method of claim 13 wherein the decreasing is based at least in part on a Q factor.

15. A system comprising:
a processor;
memory operatively coupled to the processor; and
processor-executable instructions stored in the memory to instruct the system wherein the instructions comprise instructions to
receive seismic data that comprise an associated bandwidth;
for a number of frequency bands, iteratively filter and adjust the seismic data by application of band-pass filters to extract information associated with each of the frequency bands wherein to adjust the seismic data comprises, after each iteration, to subtract extracted information from the seismic data prior to a subsequent iteration to form residual seismic data to filter by the subsequent iteration;
balance the extracted information to generate spectrally balanced seismic data; and
output the spectrally balanced seismic data.

16. The system of claim 15 wherein the instructions comprise instructions to determine local amplitude maxima for the seismic data and to balance the extracted information based at least in part on the local amplitude maxima.

17. The system of claim 15 wherein the instructions to balance comprise instructions to scale.

18. One or more non-transitory computer-readable storage media comprising computer-executable instructions to instruct a computer wherein the instructions comprise instructions to
receive seismic data that comprise an associated bandwidth;
for a number of frequency bands, iteratively filter and adjust the seismic data by application of band-pass filters to extract information associated with each of the frequency bands wherein to adjust the seismic data comprises, after each iteration, to subtract extracted information from the seismic data prior to a subsequent iteration to form residual seismic data to filter by the subsequent iteration;
balance the extracted information to generate spectrally balanced seismic data; and
output the spectrally balanced seismic data.

19. The one or more non-transitory computer-readable storage media of claim 18 wherein the instructions comprise instructions to determine local amplitude maxima for the seismic data and to balance the extracted information based at least in part on the local amplitude maxima.

20. The one or more non-transitory computer-readable storage media of claim 18 wherein the instructions to balance comprise instructions to scale.

* * * * *